(12) United States Patent
Tsou et al.

(10) Patent No.: US 11,514,189 B2
(45) Date of Patent: Nov. 29, 2022

(54) DATA COLLECTION AND ANALYSIS METHOD AND RELATED DEVICE THEREOF

(71) Applicant: Etron Technology, Inc., Hsinchu (TW)

(72) Inventors: Yao-Tung Tsou, Taipei (TW); Hao Zhen, Beijing (CN); Ching-Ray Chang, Taipei (TW); Sy-Yen Kuo, Taipei (TW)

(73) Assignee: ETRON TECHNOLOGY, INC., Hsinchu (TW)

(*) Notice: Subject to any disclaimer, the term of this patent is extended or adjusted under 35 U.S.C. 154(b) by 733 days.

(21) Appl. No.: 16/286,627

(22) Filed: Feb. 27, 2019

(65) Prior Publication Data
US 2019/0272388 A1 Sep. 5, 2019

Related U.S. Application Data

(60) Provisional application No. 62/636,857, filed on Mar. 1, 2018.

(51) Int. Cl.
*G06F 21/60* (2013.01)
*G06F 21/62* (2013.01)
*H04L 9/06* (2006.01)
*G06F 7/58* (2006.01)

(52) U.S. Cl.
CPC ........ *G06F 21/6254* (2013.01); *G06F 7/582* (2013.01); *G06F 7/588* (2013.01); *H04L 9/0643* (2013.01)

(58) Field of Classification Search
CPC ...... G06F 21/6245; G06F 7/582; G06F 7/588; H04L 9/0643
See application file for complete search history.

(56) References Cited

U.S. PATENT DOCUMENTS

| | | | | |
|---|---|---|---|---|
| 10,229,282 | B2* | 3/2019 | Sierra | G06F 21/6245 |
| 10,599,868 | B2* | 3/2020 | Barraclough | G06F 1/28 |
| 10,778,633 | B2* | 9/2020 | Friedman | G06F 21/6254 |
| 2017/0353855 | A1* | 12/2017 | Joy | H04W 12/02 |
| 2017/0357820 | A1* | 12/2017 | Sierra | H04L 9/0631 |
| 2018/0189164 | A1* | 7/2018 | Kulkarni | G06F 21/6245 |
| 2019/0236306 | A1* | 8/2019 | Ding | G06F 11/3466 |

FOREIGN PATENT DOCUMENTS

CN 105306194 A 2/2016

OTHER PUBLICATIONS

Ulfar Erlingsson, RAPPOR: Randomized Aggregatable Privacy-Preserving Ordinal Response, Aug. 25, 2014, pp. 1-14 (Year: 2014) (Year: 2014).*
Ulfar Erlingsson, RAPPOR: Randomized Aggregatable Privacy-Preserving Ordinal Response, Aug. 25, 2014, pp. 1-14 (Year: 2014).*

* cited by examiner

*Primary Examiner* — Trang T Doan
(74) *Attorney, Agent, or Firm* — Birch, Stewart, Kolasch & Birch, LLP

(57) ABSTRACT

A data collection and analysis method includes applying a first noise step to an original data stream with an original character to generate a first data stream with a first character; and applying a second noise step to the first data stream to generate a second data stream with a second character, wherein a first variation between the original character and the first character is greater than a second variation between the original character and the second character.

11 Claims, 15 Drawing Sheets

DATA COLLECTION AND ANALYSIS METHOD AND RELATED DEVICE THEREOF

CROSS REFERENCE TO RELATED APPLICATIONS

This application claims the benefit of U.S. Provisional Application No. 62/636,857, filed on Mar. 1, 2018 and entitled "SPINTRONICS-BASED PRIVATE AGGREGATABLE RANDOMIZED RESPONSE (SPARR) FOR CROWDSOURCED DATA COLLECTION AND ANALYSIS", the contents of which are incorporated herein by reference.

BACKGROUND OF THE INVENTION

1. Field of the Invention

The present invention relates to a data collection and analysis method and a related device thereof, and particularly to a method and a related device that can utilize a first noise step and a second noise step to de-identify identification information in an original data stream.

2. Description of the Prior Art

In contemporary society, data is crucial for both institutions and individuals. However, they approach data differently. Institutions such as corporations and academic institutes wish to obtain useful information from aggregated user data to improve the pertinence of services or formulate development strategies. By contrast, individuals share their data with interested third parties to obtain various potential benefits but prefer to ensure that their private information such as applications (apps) usage, locations visited, and web browsing history are not revealed. People therefore face a dilemma between maximizing the quality of experiences and minimizing the extent of privacy leakage.

The randomized response mechanism [17] has drawn considerable interest from the theory community, which can address the aforementioned dilemma. The concept of randomized response is to induce noise locally before sharing data with any curators. In contrast to centralized differential privacy mechanisms [6] [7] or encryption-based privacy-preserving mechanisms [8] [10], which need the assumptions of the trusted third party or can be used only in a limited range of applications, randomized response mechanisms can provide a rigorous privacy guarantee by the definition of local differential privacy while having broader application scenarios. In particular, randomized response mechanisms can provide a rigorous privacy guarantee while satisfying differential privacy. In other words, individuals have "plausible deniability" that attackers cannot infer any sensitive information with high confidence, regardless of the attackers' background knowledge.

Randomized response was proposed by Warner [17] in 1965 as a survey technique for sensitive questions. After more than 40 years, Dowrk et al. proposed a robust and mathematically rigorous definition of privacy in [7] and formally named it; they also proposed the definition of differential privacy in [6]. The local model of private learning was first described by Kasiviswanathan et al. [16], who pioneered the practice of connecting the randomized response to differential privacy. Later, Chan et al. [18] proved that randomized response has optimal lower bound in the locally differentially private model, referred to as local differential privacy.

In recent years, the local model has received increasing attention because it does not require a trusted data curator [15]. In practical applications, people want to know which elements occur the most frequently among all items, referred to as the heavy-hitters problem. Erlingsson et al. developed randomized aggregatable privacy-preserving ordinal response (RAPPOR) [21], which uses the Bloom filter [5] to represent the true client-side string and release an obfuscated version after two layer randomized response. One of the greatest contributions of RAPPOR is its delicate decoding framework for learning statistics, which can not only identify the heavy hitters but also rebuild the frequency distribution.

Since the development of RAPPOR, many studies of private learning have been conducted under the local model. An extended version of RAPPOR was proposed by Fanti et al. [11]. They presented a new decoding algorithm to address two problems in RAPPOR: (1) aggregators can only determine the marginal distribution and not joint distribution; (2) aggregators can only decode efficiently under a precise data dictionary. However, in targeting these two problems, they sacrifice the capability to accurately reconstruct data. After decoding, aggregators could only observe a few clients' strings that appear with high frequency.

Qin et al. [23] devised a two-phase mechanism named LDPMiner, which first uses part of the privacy budget $\varepsilon$ [6] to generate a candidate set of heavy hitters and then uses the remaining part to refine the results. LDPMiner expanded the application scenario of RAPPOR, which focused on heavy hitter discovery in set-valued data instead of categorical data.

Wang et al. [20] introduced the OLH protocol to determine the optimal parameters for RAPPOR. However, OLH is only applied to discover heavy hitters for the small size of the domain of the values the users have. By contrast, RAPPOR and the method of the present invention do not have this constraint. Sei and Ohsuga [22] proposed S2M and S2 Mb and used mean square errors (MSEs) and Jensen-Shannon (JS) divergence to illustrate that both can achieve utility similar to RAPPOR. Although [20] and [22] were significative to the development of RAPPOR, the different indicators in evaluation mean that the present invention cannot make horizontal comparison on them.

In addition, other works that are different from RAPPOR also inspired the present invention. Bassily and Smith [14] gave protocols that produce a succinct histogram, that is, the heavy hitters with the number of times they appear, and showed that their protocols matching lower bounds for frequency estimation. Papernot et al. [13] demonstrated PATE that is a machine learning strategy to preserve sensitive training data. PATE trains "teachers" model on disjoint subsets (e, g., different subsets of clients) of the sensitive data, and then a "student" model learns to predict an output chosen by noisy voting among all of the "teachers" model.

It is noteworthy that the randomness of randomized response mechanisms, such as [11] [20] [21], comes from coin flip controlling by pseudorandom number generators (PRNGs) or cryptographically secure pseudo-random number generators (CSPRNGs). The quality of random number function greatly affects the degree of privacy protection. However, the insecurity can be seen directly. More precisely, PRNGs/CSPRNGs are implemented in software and use deterministic algorithms, such as =dev=urandom [9], to generate a sequence of random numbers, which is safe for cryptographic use only if the seed can be selected correctly.

SUMMARY OF THE INVENTION

An embodiment of the present invention provides a data collection and analysis method. The method includes applying a first noise step to an original data stream with an original character to generate a first data stream with a first character; and applying a second noise step to the first data stream to generate a second data stream with a second character, wherein a first variation between the original character and the first character is greater than a second variation between the original character and the second character.

Another embodiment of the present invention provides a data collection and analysis method. The method includes applying a first noise step to an original data stream with a featured distribution to generate a first data stream with a first distribution; and applying a second noise step to the first data stream to generate a second data stream with a second distribution, wherein a first variation between the featured distribution and the first distribution is greater than a second variation between the featured distribution and the second distribution.

Another embodiment of the present invention provides a data collection and analysis device. The device includes a first processor and a second processor. The first processor applies a first noise step to an original data stream with an original character to generate a first data stream with a first character; and the second processor applies a second noise step to the first data stream to generate a second data stream with a second character, wherein a first variation between the original character and the first character is greater than a second variation between the original character and the second character.

Another embodiment of the present invention provides a data collection and analysis device. The device includes a true random number generator and a processor unit. The true random number generator generates a plurality of random number without the need of a seed. The processor unit, based on the plurality of random number, de-identifies identification information in an original data stream with an original character and generating a second data stream with a second character. The second character is substantially similar to the original character.

In the present invention, truly random number generators (TRNGs) should be considered as a fundamental building block of privacy-preserving mechanisms. TRNGs are implemented in hardware and generate a sequence of random numbers using a nondeterministic physical event such as magnetization variation of a ferromagnetic layer and flux transmission in a single flux quantum device. The initial state in TRNGs is truly unknown while the initial state in PRNGs/CSPRNGs must be manually kept secret. However, the major drawback of TRNGs is scalability, which is important especially for Internet of Things (IoT), expected to handle a growing amount of data securely. A magnetic tunnel junction (MJT) can be referred as a spintronics-based TRNG. Binary random bits are generated by using the stochastic nature of spin-transfer-torque (STT) switching in MJTs. Owing to the scalability of spin-torque switching [12], the MTJ can operate as a scalable TRNG and can be integrated on a chip in high density and low power consumption.

For achieving the purpose of analyzing data with high accuracy and strong privacy, the intuitive way is to shuffle the primitive data while ensuring the randomness inside the algorithms through a series of elaborated encoding techniques and analysis mechanisms.

Motivated by this, the present invention establishes the spintronics-based private aggregatable randomized response (SPARK), an advanced data collection and analysis mechanism that conforms to the differential privacy requirements by using a multilayer randomized response based on a set of MTJs. To the best of our knowledge, the integration of multilayer randomized responses with spin-electronic physical events to enhance data utility and privacy for practical applications has not been developed.

The main contributions of the present invention include: 1) the present invention proposes the multilayer randomized response mechanism, which can significantly improve the accuracy of data analysis while satisfying the definition of local differential privacy; 2) the present invention leverages a set of MTJs as a TRNG to generate unpredictable random bits and design an approach to convert random bits into random numbers between 0 and 1, in which the TRNG can be seamlessly integrated with multilayer randomized response mechanism and used to strengthen the randomness of our algorithm's outputs; 3) the present invention evaluates the method by a sequence of experiments in both simulation and real-world environment to verify that the method outperforms prior works.

These and other objectives of the present invention will no doubt become obvious to those of ordinary skill in the art after reading the following detailed description of the preferred embodiment that is illustrated in the various figures and drawings.

DETAILED DESCRIPTION

In the present invention, SPARR mainly focuses on two aspects that are distinct from the aforementioned schemes: (1) the present invention employs a set of MTJs as the spintronics-based TRNG, which can provide the rigorous privacy protection; (2) the present invention proposes a multilayer randomized response mechanism to protect the data privacy and improve the data utility, and use the false negative rate, the total variation distance, and the allocated mass as metrics of the present invention to prove that SPARR can achieve significant favorable performance than prior works.

In this section, the definition of SPARR, including the system model, the attack model, and notations are formulated and described in detail.

A. System Model

Figure 1:
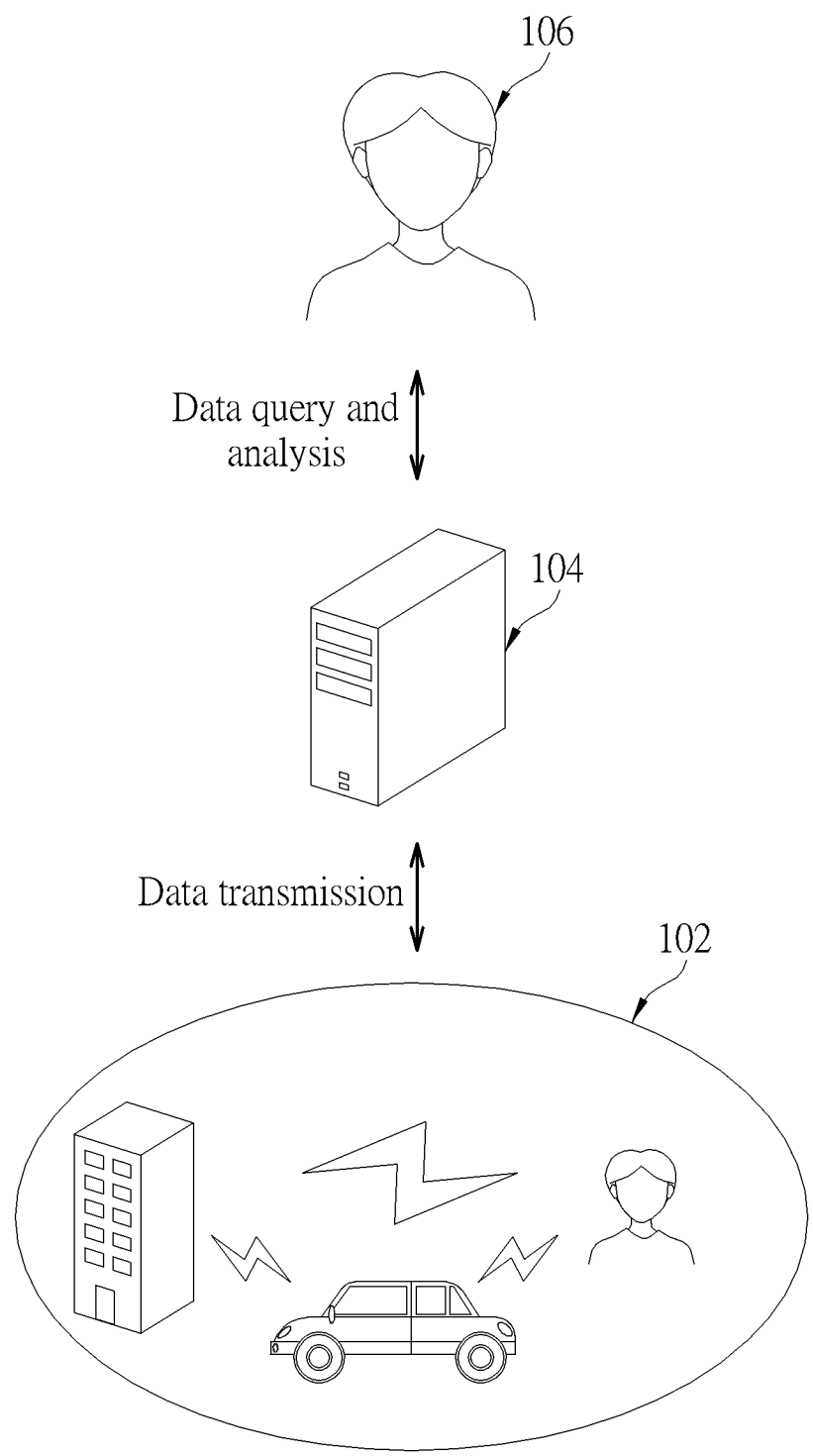
FIG. 1 is a diagram illustrating a model of crowd sensing and collection for SPARR.

In the present invention, the present invention considers a model, composed of unconditionally trusted clients 102 (data generation), and semi-trusted storage servers 104 (data collection) and analysts 106 (data analysis) as shown in FIG. 1. Without loss of generality, the authorization between clients and analysts is appropriately conducted off-line or on-line. However, the authorization is out of the scope of the present invention. More details regarding to the authorization of clients can be referred to [19].

As depicted in FIG. 1, storage servers can collect sanitized values and strings transmitted from large numbers of clients. Moreover, analysts are permitted to do statistics on these client-side sanitized values and strings, such as histograms, frequencies, and other statistic indicators for finding their app preferences, historical activities, or other information. For any given sanitized value or string reported, SPARR can guarantee a strong plausible deniability for the reporting client through a sequence of encoding steps, as measured by an ε-differential privacy bound. Doing so, SPARR strictly limits private information leaked.

B. Attack Model

In crowd sensing and collection modes, client-side private data can be disclosed by many ways. Assuming that storage servers and analysts are honest-but-curious, they may leak private information unintentionally by publishing data analyses or may violate the privacy intentionally by gathering sensitive data. There are several attack types, such as the attacker may poach data stored on servers or attempt to eavesdrop on communication between clients and servers. For remedying these attacks, the present invention adopts a local privacy-preserving mechanism that is implemented on each client and sanitizes any information before it is outsourced by the client. The local privacy preserving mechanism satisfying the definition of ε-differential privacy (called local differential privacy) can have rigorous privacy guarantee, regardless of the attackers' background knowledge.

C. Notations

Figure 2:
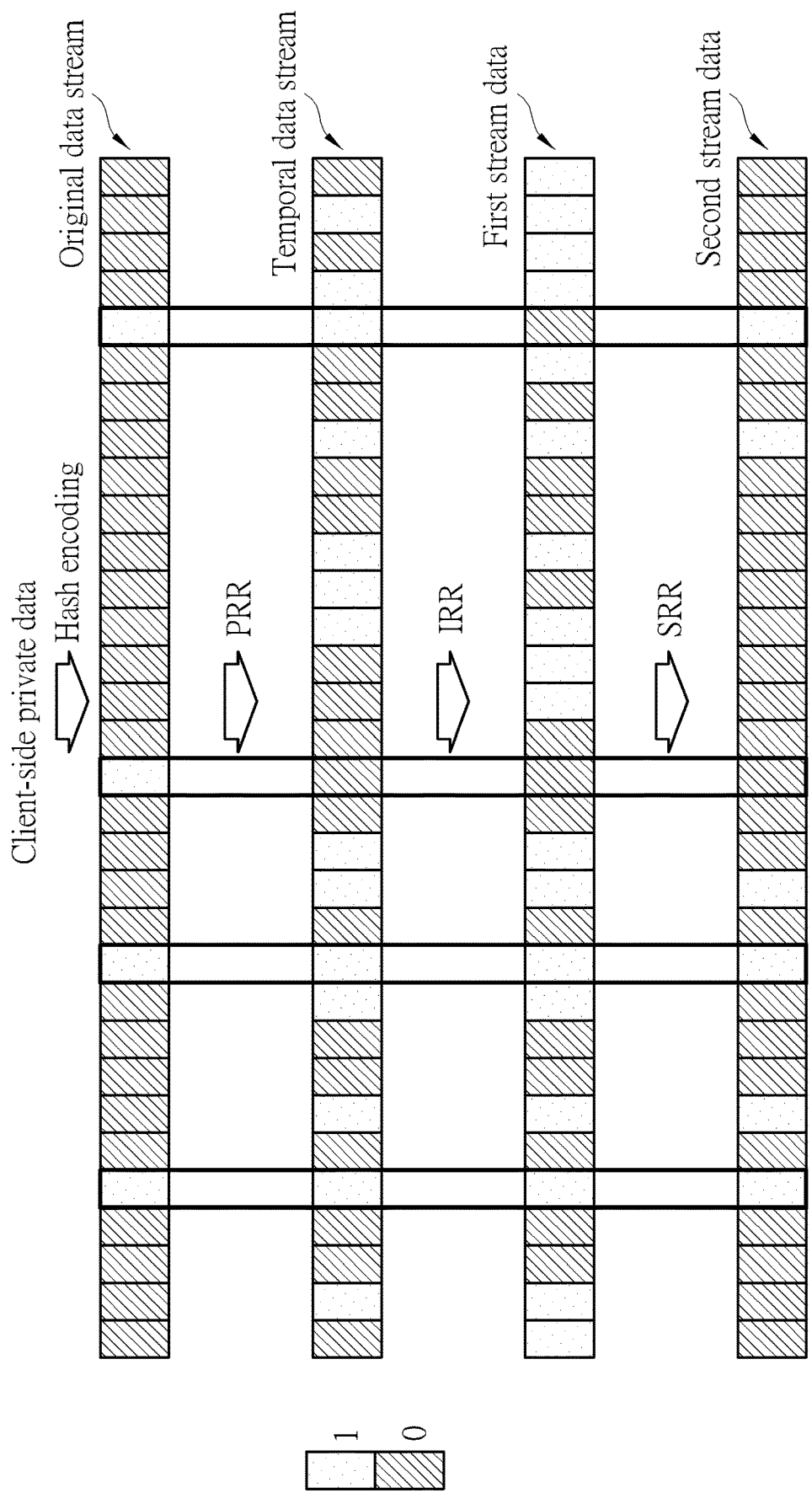
FIG. 2 is a diagram illustrating Hash encoding, the permanent randomized response (PRR), the instantaneous randomized response (IRR), and the synthetic randomized response (SRR).

Please refer to FIG. 2. FIG. 2 is a diagram illustrating Hash encoding, permanent randomized response (PRR), instantaneous randomized response (IRR), and synthetic randomized response (SRR), wherein detailed descriptions of FIG. 2 are as follows.

In the present invention, N represents the number of reports, m represents the number of cohorts, h represents the number of hash functions (that is, Hash encoding), wherein a pre-processor receives an input data stream (e.g. the client-side private data stream) and utilizes Hash encoding to the input data stream to generate an original data stream with an original character (e.g. positions of "1" of the original data stream shown in FIG. 2), wherein the input data stream correspond to a plurality of users. In addition, the pre-processor can be a field programmable gate array (FPGA) with the above mentioned functions of the pre-processor, or an application-specific integrated circuit (ASIC) with the above mentioned functions of the pre-processor, or a software module with the above mentioned functions of the pre-processor, k represents the size of Bloom filter, p, q, and f represent probability parameters for the degree of data privacy, $b_i$, $b'_i$, $s_i$ and $s'_i$, represent the resultant bits of Bloom filter, PRR, IRR, and SRR, respectively. ε represents the privacy budget of differential privacy, q' represents the probability of generating 1 in the report $s'_i$, if the Bloom filter bit $b_i$ is set to 1, p' represents the probability of generating 1 in the report $s'_i$, if the Bloom filter bit k is set to 0. And A represents the number of unique client-side strings.

Preliminaries

In this section, the present invention briefly describes the definitions of differential privacy and randomized response.

A. Differential Privacy and Randomized Response

The concept of differential privacy [6] ensures that the outputs of certain mechanisms have almost the same probability to appear. In other words, the presence or absence of any individual in the dataset will never significantly influence the outputs.

Suppose there is a universe D that contains all the different elements. Conveniently, the present invention uses multisets of rows to represent a dataset D, which can be seen as a collection of elements in D and is held by a trusted curator. Then the present invention can uses Hamming distance to measure the difference between any two datasets D1 and D2, which is denoted by H(D1;D2). If H(D1;D2)=1, then D1 and D2 are called neighboring datasets.

Formally, a randomized algorithm M is ε-differentially private if for all $S_M$ ⊂ Range (M) and the neighboring datasets D1 and D2 (shown in equation (1)).

$$Pr[M(D_1) \in S_M] \le e^\varepsilon \times Pr[M(D_2) \in S_M] \quad (1)$$

As shown in equation (1), the probability is over the coin flips of the mechanism M, and ε is called privacy budget and determines the extent of privacy leakage. A smaller ε will provide better privacy with the price of lower accuracy.

The local model of differential privacy [16], namely local differential privacy, considers a situation in which there is no trusted curator. Individuals hold their own private data and release it to curators in a differentially private manner. In this case, the dataset D will evolve into a sequence of client strings d, and the neighboring datasets D1 and D2 will also evolve into two distinct strings d1 and d2. Therefore, a local randomized algorithm M is ε-differential privacy if for all $S_M$ c Range (M) and every pair of distinct strings d1 and d2 (shown in equation (2)).

$$Pr[M(d_1) \in S_M] e^\varepsilon \times Pr[M(d_2) \in S_M] \quad (2)$$

As shown in equation (2), the probability of outputs is taken in terms of the coin flips of the algorithm M.

Randomized response [17] is a technique developed long before differential privacy. It uses secret coin flips as random events to generate the answers to sensitive questions, such as "Are you a homosexual?" An individual would answer this truthfully only if the coin is tail. Otherwise, the individual will flip a second coin to determine the fake answer, and respond "Yes" if head and "No" if tail. Randomized response is a proven efficient mechanism that satisfies local differential privacy [18].

SPARR System

SPARR includes two key elements, namely multilayer randomized response and spintronics-based encoding, to provide a high-utility truly randomized response with a rigorous data privacy guarantee.

A. Multilayer Randomized Response

The present invention interprets SPARR from the perspective of coin flips. Initially, each client side is permanently assigned to one of m cohorts, and each cohort uses a different group of h hash functions. For simplicity, the present invention considers the case that m=1 in this section (i.e., all client sides use the same group of hash functions). Then, the present invention hashes the client-side string v onto the k-size Bloom filter B. In this sequence, each bit $b_i$ in B will be reported after four rounds of perturbation determined by flipping specific coins. The present invention depicts the weight of each coin in Table I, in which probability parameters fall into the range of 0 to 1.

The first layer is called the permanent randomized response (PRR), which is similar to the initial randomized response in Section III-A. The result of PRR, $b'_i$, is generated by coins 1 and 2, where the first coin is an unfair coin that comes up as heads with probability f. If the result of a coin flip is head, $b'_i$ will be determined by the second coin with fair probability.

TABLE I

COIN FLIPS IN SPARR, WHERE $f \in [0; 1)$, $p \in (0; 1)$, $q \in (0; 1)$, AND $p \neq q$

| Bit String | | Head | Tail |
|---|---|---|---|
| Bloom filter bit ($b_i$) | — | — | — |
| PRR ($b_i'$) | Coin 1 | f | 1 − f |
| | Coin 2 | 1/2 | 1/2 |
| IRR ($s_i$) | Coin 3 | $q^{b_i'}p^{1-b_i'}$ | $(1-q)^{b_i'}(1-p)^{1-b_i'}$ |
| SRR ($s_i'$) | Coin 4 | $\dfrac{b_i + b_i' + s_i}{3}$ | $1 - \dfrac{b_i + b_i' + s_i}{3}$ |

Otherwise, the present invention will do nothing and let $b'_i$ be the true value of $b_i$. The second layer, the instantaneous randomized response (IRR), is created to protect longitudinal security [4], wherein a first processor can apply the permanent randomized response at least one time to the original data stream based on a first random number set generated by a true random number generator to generate a temporal data stream (shown in FIG. 2), and apply the instantaneous randomized response at least one time to the temporal data stream based on a second random number set generated by the true random number generator to generate a first data stream with a first character (shown in FIG. 2). In addition, the permanent randomized response and the instantaneous randomized response are included in a first noise step, and identification information in the original data stream is de-identified after the first processor applies the first noise step to the original data stream. In addition, the first processor can be a field programmable gate array with the above mentioned functions of the first processor, or an application-specific integrated circuit with the above mentioned functions of the first processor, or a software module with the above mentioned functions of the first processor.

The result of IRR, $s_i$, is generated by coin 3. Notably, $b'_i$ will affect the weight of coin 3. If $b'_i=1$, the probability of head is q; otherwise, the probability of head is p. In fact, these two layers can guarantee the data privacy but lose information so that later data analysis is inaccurate.

An intuitive way to improve the accuracy of data analysis is to retain more features from the primitive data without compromising data privacy. The last layer, the synthetic randomized response (SRR), is constructed in SPARR on the basis of PRR and IRR to strengthen the features in $b_i$ being kept in $s'_i$ while preserving the randomness of the results, wherein a second processor applies the synthetic randomized response at least one time to the first data stream based on a third random number set generated by the true random number generator to generate a second data stream with a second character (shown in FIG. 2), and the synthetic randomized response is included in a second noise step. In addition, a first variation between the original character and the first character is greater than a second variation between the original character and the second character (shown in FIG. 2).

That is, the synthetic randomized response can recovery and intensify the original character to make the second data stream approach the original data stream. For example, positions of "1" in the original data stream are similar to positions of "1" in the second data stream. The present invention therefore employs $s'_i$ to efficiently reconstruct the client-side strings, even though these strings have a low frequency. SRR operates the last coin, as shown in Table I, wherein a function of SRR is used for reducing shift caused by PRR and IRR. The present invention designs the weight of this coin through the synthetic consideration of the values of $b_i$, $b'_i$, and $s_i$. The more frequent the occurrence of is in $b_i$, $b'_i$, and $s_i$, the higher the probability that the coin will be heads. For example, if two of the three are 1s, then the probability of head will be ⅔. In addition, the hash function, PRR, SRR, and IRR are executed on the client sides. In addition, an output circuit can output the original data stream, the first data stream, and the second data stream to server(s) on the Internet.

Figure 3:
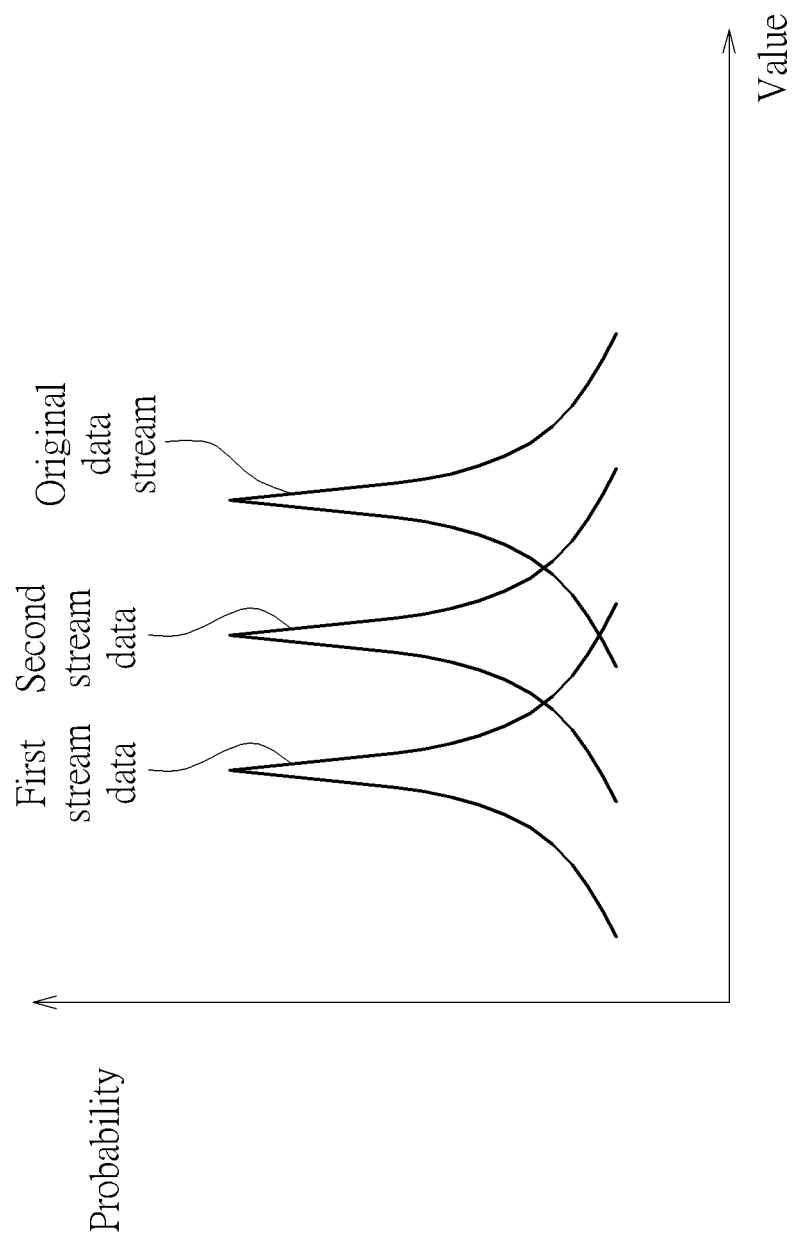
FIG. 3 is a diagram illustrating the original data stream having the featured distribution, the first data stream having the first distribution, and the second data stream having the second distribution.

Please refer to FIG. 3. FIG. 3 is a diagram illustrating the original data stream having the featured distribution, the first data stream having the first distribution, and the second data stream having the second distribution. In another embodiment of the present invention, after the pre-processor utilizes Hash encoding to input data streams (e.g. client-side private data streams) to generate the original data stream, the original data stream has the featured distribution; after the first processor applies the permanent randomized response to the original data stream and applies the instantaneous randomized response to the temporal data stream to generate the first data stream, the first data stream has the first distribution; and after the second processor applies the synthetic randomized response to the first data stream to generate the second data stream, the second data stream has the second distribution. Therefore, when the server (s) on the Internet receives original data streams, first data streams, and second data streams, the server (s) can plot FIG. 3 according to featured distribution of the original data streams, first distribution of the first data streams, and second distribution of the second data streams, wherein as shown in FIG. 3, a third variation between the featured distribution and the first distribution is greater than a fourth variation between the featured distribution and the second distribution.

In addition, in another embodiment of the present invention, a data collection and analysis device includes a true random number generator, a processor unit, a pre-processor, and an output circuit, wherein the processor unit includes a first processor and a second processor. The true random number generator can generate a plurality of random number without the need of a seed (e.g. a first random number set, a second random number set, and a third random number set). The pre-processor receives an input data stream (e.g. the client-side private data stream) and utilizes Hash encoding to the input data stream to generate an original data stream with an original character (e.g. positions of "1" of the original data stream shown in FIG. 2). After the original data stream is generated, the first processor can apply the first noise step (PRR and IRR) to the original data stream based on the first random number set and the second random number set to de-identify the original data stream to generate a first data stream with a first character; and after the first data stream is generated, the second processor can apply the second noise step (SRR) to the first data stream based on the third random number set to generate a second data stream with a second character, wherein a first variation between the original character and the first character is greater than a second variation between the original character and the second character. In addition, the output circuit can output the second data stream to a remote server (on the Internet).

Figure 4:
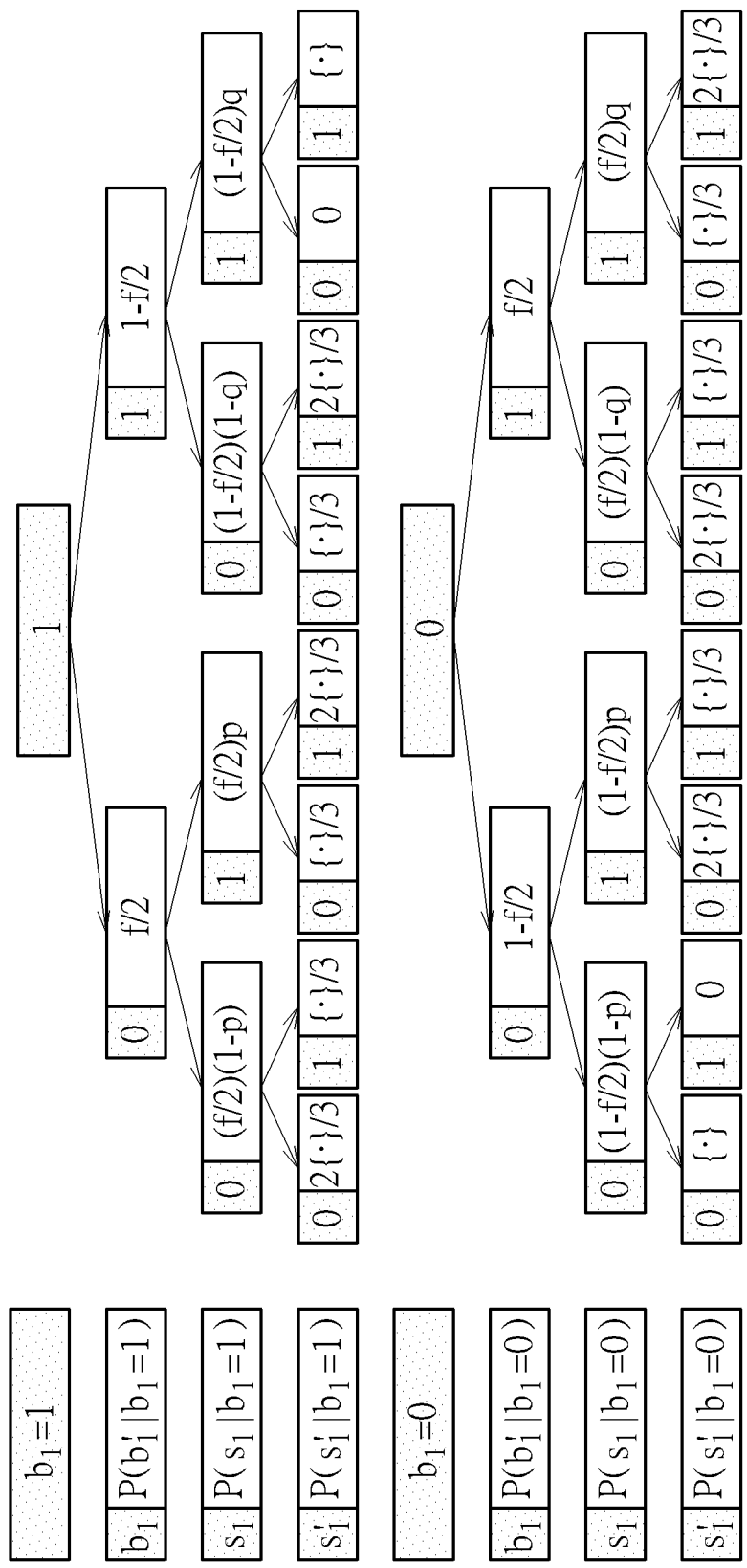
FIG. 4 is a diagram illustrating the multilayer randomized response from the perspective of conditional probability.

In summary, the present invention can quantitatively interpret SPARR from the perspective of conditional probability, as shown in FIG. 4. Each round operates under the conditions $b_i=1$ and $b_i=0$. As shown in FIG. 4, for simplicity, $\{\bullet\}$ denotes probability $P\{si/bi\}$.

In addition, the present invention has lemmas 1 and 2 as follows:

LEMMA 1. When the Bloom filter bit $b_i$ is set to 1, the probability of generating 1 in the report $s'_i$ is given by equation (3):

$$q' = P(s'_i = 1 \mid b_i = 1) \quad (3)$$
$$= \frac{1}{3}\left[\frac{f}{2}(1-p)\right] + \frac{2}{3}\left[\frac{f}{2}p + \left(1-\frac{f}{2}\right)(1-q)\right] + \left(1-\frac{f}{2}\right)q$$
$$= \frac{1}{3}\left[2 + q - \frac{f}{2}(1-p+q)\right]$$

LEMMA 2. When the Bloom filter bit $b_i$ is set to 0, the probability of generating 1 in the report $s'_i$ is given by equation (4):

$$p' = P(s'_i = 1 \mid b_i = 0) \quad (4)$$
$$= \frac{1}{3}\left[\left(1-\frac{f}{2}\right)p\right] + \frac{f}{2}(1-q)\right] + \frac{2}{3}\left[\frac{f}{2}q\right]$$
$$= \frac{1}{3}\left[p + \frac{f}{2}(1-p+q)\right]$$

Lemmas 1 and 2 can be evidenced in FIG. 4.

To decode the collection $s'_i$ for aggregators, the number of times $t_i$ required for reconstructing the exact bit $b_i$ in the Bloom filter B must be estimated. Let $c_i$ be the number of times that each bit $s'_i$ is set in N reports. Therefore, the expectation of $c_i$ is given by equation (5):

$$E(c_i) = q't_i + p'(N - t_i) \quad (5)$$
$$\text{where } t_i = \frac{c_i - p'N}{q' - p'}.$$

B. Spintronics-Based Encoding

As the present invention stated in the formal definition of randomized response, the probability of outputs is based on the coin flips in algorithm M. In other words, the results of coin flips can be considered a random bit string in M. To guarantee the randomness of the bit strings, a traditional PRNG/CSPRNG can be superseded by a TRNG.

In the present invention, the present invention adopt a set of MTJs as a TRNG, which is viewed as a spintronics-based TRNG. The operation of controlling an MTJ to generate random bits is as follows. There are two states for an MTJ [12] [3]: Anti-parallel (AP) and Parallel (P), which are assigned to the binary values "0" and "1", respectively. The initial state (that is, a seed) in the MTJ is unknown, so the MTJ does not need the initial state. Therefore, because the MTJ does not need the initial state, the MTJ can generate random numbers without needing the initial state (the seed) to prevent from privacy leak caused by a periodicity problem of the initial state (the seed). When a current pulse was injected into an MTJ to switch the magnetization in the free layer by spin-transfer torque, the free-layer magnetization of the MTJ is excited to a bifurcation point by the excite pulse. At the bifurcation point, thermal agitation can cause a small random deviation of magnetization. Then, the magnetization will relax to the AP or P state with the same probability of 50%. Eventually, the present invention determines whether the final state is AP or P by measuring the resistance, and thus the present invention can obtain a random bit.

To generate sufficient randomness for bit strings, the present invention leveraged eight subsystems independently to generate a random bit string $R_i$ using the stochastic spin-torque switching in MTJs. Subsequently, three rounds of exclusive OR operation are executed to generate the final result (shown in equation (6), $$XOR^3 = [(R_1 \otimes R_2) \otimes (R_3 \otimes R_4)] \otimes [(R_5 \otimes R_6) \otimes (R_7 \otimes R_8)] \quad (6)$$

As shown in equation (6), $XOR^3$ denotes the final result of the random bit string and denotes an exclusive OR operation. Notably, the MTJ is an emerging magnetic material with properties of high endurance, low power consumption, and rapid access. Moreover, it is easily integrated into many devices such as those in the IoT. In particular, the MTJ is a material used in Spin-Transfer Torque Magnetic Random Access Memory (STT-MRAM). STT-MRAM, a nonvolatile memory, has the potential to become a leading storage technology as it is a high-performance memory that can challenge DRAM, SRAM, and the low cost flash memory. The potential advantages of MTJs are the reasons for the present invention to adopt it as a component in the present invention.

As mentioned for multilayer randomized response mechanism, one of the most critical procedures for data protection is IRR, which avoids the risk of privacy leakage under repeated data collection by generating a different report every time based on the fixed results of PRR. Therefore, the randomness of IRR determines the performance of longitudinal privacy protection. The present invention introduces a set of MTJs as TRNG( ), which is based on nondeterministic physical events. However, MTJs can only generate random bits. Therefore, the present invention must design an approach to convert random bits into random numbers between 0 and 1.

Algorithm 1 shows the process that uses a set of MTJs to generate random numbers. The length of the random bit sequence 1 should be carefully selected because it will decide the granularity of the random numbers. First, the present invention initializes eight MTJs and operate them independently to generate 1 random bits, followed by executing three rounds of exclusive OR operation to generate a binary bit sequence x=XOR3 (step 2 of Algorithm 1). Finally, the binary bit sequence x is converted to a random number x* by the equation float $(x \div (2^1 - 1))$ (step 3 of Algorithm 1).

| ALGORITHM 1: TRNG( ) |
| --- |
| Input: length of random bit sequence l ∈ N |
| Output: random number x* ∈ [0,1] |
| 1   Initialize MTJs and generate l random bits; |
| 2   Execute three rounds of exclusive OR operation to generate a binary bit sequence x = XOR³; |
| 3   Convert x into a random number x*: x* = float(x/2ˡ − 1)); |
| 4   Return x*; |

The Algorithm 2 is demonstrated by randomized data encoding via TRNG( ) in SPARR. For each bit TRNG( ) is employed to generate a random number x* (step 1 of Algorithm 2), and then x* is compared with the probability $q^{b'_i} p^{1-b'_i}$ (step 2 of Algorithm 2). If x is less than $q^{b'_i} p^{1-b'_i}$, $s_i$ is set to 1; otherwise, $s_i$ is set to 0 (steps 2-5 of Algorithm 2).

| ALGORITHM 2: Data Randomized Encoding via TRNG( ) |
| --- |
| Input: a resultant bit of PRR $b'_i$, and probability parameters p and q |
| Output: an encoded bit $s_i$ |
| 1   x*=TRNG( ); |
| 2   if x* < $q^{b'_i} p^{1-b'_i}$ then |
| 3       set $s^i$ = 1; |
| 4   else |
| 5       set $s^i$ = 0; |
| 6   end |
| 7   Return $s^i$; |

System Analysis

A. Differential Privacy Guarantee

THEOREM 1. SPARR is a ε-differential privacy algorithm, wherein definition of ε is given by equation (7):

$$\varepsilon = h \cdot \ln\left[\frac{q'(1-P')}{p'(1-q')}\right] \quad (7)$$

Without loss of generality, the present invention supposes that va and vb are two distinct client-side strings, and their Bloom filter bits are set by equation (8):

$$B_a = \{b_1=1, \ldots, b_h=1, b_{h+1}=0, \ldots, b_k=0\},$$

$$B_b = \{b_1=0, \ldots, b_h=0, b_{h+1}=1, \ldots, b_{2h}=1, b_{2h+1}=0, \ldots, b_k=0\} \quad (8)$$

According to Lemmas 1 and 2, the present invention knows that $s'_i$ is a random variable with Bernoulli distribution, and the probability mass functions under different conditions are determined equations (9)-(12):

$$P(s'_i | b_i = 1) = (q')^{s'_i}(1-q')^{1-s'_i} = \begin{cases} q', & s'_i = 1 \\ 1-q', & s'_i = 0 \end{cases} \quad (9)$$

And $$P(s'_i | b_i = 0) = (p')^{s'_i}(1-p')^{1-s'_i} = \begin{cases} p', & s'_i = 1 \\ 1-p', & s'_i = 0 \end{cases} \quad (10)$$

Then, $$P(s' = s'_a | B = B_a) = \prod_{i=1}^{h}(q')^{s'_i}(1-q')^{1-s'_i} \cdot \prod_{i=h+1}^{k}(p')^{s'_i}(1-p')^{1-s'_i} \quad (11)$$

And $$P(s' = s'_a | B = B_b) = \prod_{i=1}^{h}(p')^{s'_i}(1-p')^{1-s'_i} \cdot \prod_{i=h+1}^{2h}(q')^{s'_i}(1-q')^{1-s'_i} \cdot \prod_{i=2h+1}^{k}(p')^{s'_i}(1-p')^{1-s'_i} \quad (12)$$

Let RP be the ratio of two conditional probabilities and S be all possible outputs of S'. Using the conclusions drawn from Observation 1 in [21], RP can derive by equation (13):

$$RP = \frac{P(s' \in s | B = B_a)}{P(s' \in s | B = B_b)} \quad (13)$$

$$= \frac{\sum_{s' \in s} |P(s' \in s'_i | B = B_a)|}{\sum_{s' \in s} |P(s' \in s'_i | B = B_b)|} \leq$$

$$\max_{s' \in s} \frac{P(s' \in s'_i | B = B_a)}{P(s' \in s'_i | B = B_b)}$$

$$= \max_{s' \in s}\{[q'(1-P')]^{s'_1 + \ldots + s'_h - s'_{h+1} - \ldots - s'_{2h}} \cdot [p'(1-q')]^{-s'_1 - \ldots - s'_h + s'_{h+1} + \ldots + s'_{2h}}$$

$$= \left[\frac{q'(1-P')}{p'(1-q')}\right]^h$$

As shown in equation (13), $s'_1 = \ldots = s'_h = 1$ and $s'_{h+1} = \ldots = s'_{2h} = 0$.

To satisfy the definition of differential privacy, the ratio RP must be bounded by $e^\varepsilon$. Therefore, the present invention can calculate the privacy budget ε by equation (7).

B. Randomness Analysis of Numbers Generated by MTJs

Good random numbers should meet the requirement for unpredictability, meaning that the random number should not be periodic. Specifically, good random bits should also meet the requirement for uniformity, which means 0 and 1 should occur with roughly equal frequency. Formally, after obtaining random bits by triggering eight MTJs, the present invention uses a statistical test suite (NIST-SP800 [2]) to test the random bits used in our system. The NIST-SP800 provides several types of statistical tests, which are detailed in Section 2 of [2].

TABLE II

NIST TESTING RESULTS USING BITS GENERATED BY MTJS

| Statistical Test | Proportion of passing sequences | Success/Fail |
| --- | --- | --- |
| Frequency | 987/1000 | Success |
| Block Frequency | 1000/1000 | Success |
| Cumulative Sums | 994/1000 | Success |
| Runs | 986/1000 | Success |
| Longest Run | 1000/1000 | Success |
| FFT | 995/1000 | Success |
| Approximate Entropy | 1000/1000 | Success |
| Serial | 995/1000 | Success |

Given the empirical results for eight particular statistical tests, the present invention computes the proportion of sequences as shown in Table II to indicate whether the random bits passed the test or not. In Table II, when 1000 sequences (100 bits/sequence) are used as the test target, the minimum passing rate for each statistical test with the exception of the random excursion (variant) test is approximately =0:986, passing the NIST statistical test.

EXPERIMENTAL EVALUATION

In this section, the present invention will make a detailed comparison between RAPPOR and SPARR. Though Fanti et al. [11] proposed an extended version of RAPPOR, it focuses on estimating client side strings without explicit dictionary knowledge. However, the accuracy of estimation in [11] is similar to or less than that of RAPPOR. Therefore, the present invention does not compare SPARR with [11].

In Section VI-A, the present invention will introduce three metrics that are used to evaluate the effects of RAPPOR and SPARR. In Sections VI-B and VI-C, the present invention will evaluate the present invention using three simulated examples and one real-world collected example, respectively. The three simulated examples use normal, zipfl, and exponential distributions to demonstrate the impacts of varying ε, k, m, and Non RAPPOR and SPARR. The real-world collected example, which is based on the Kosarak dataset [1], is used to demonstrate the impact of varying ε on RAPPOR and SPARR.

A. Resultant Metrics

Suppose A is the actual number of unique client-side strings, and ai ($i \in \{1, 2, \ldots, A\}$) is the proportion of each client-side string. Let Rr and Rs be the number of unique client-side strings reconstructed by RAPPOR and SPARR, respectively, and rri and rsi be the proportion of each reconstructed string.

Here, the present invention uses the false negative rate to analyze the extent to which RAPPOR and SPARR failed to find certain strings. For simplicity, FNr and FNs denote the false negative rates for RAPPOR and SPARR, respectively. Formally, FNr and FNs are defined by equation (14):

$$FN_r = \frac{R_r - A}{A}, FN_s = \frac{R_s - A}{A} \tag{14}$$

The total variation distance is a distance measure for two probability distributions. Informally, this is the largest possible difference between the probabilities that the two probability distributions can be assigned to the same event. In a finite probability space, the total variation distance is related to the l1 norm by its identity. For simplicity, TVr and TVs denote the total variation distances for RAPPOR and SPARR, respectively. Formally, TVr and TVs are defined by equation (15):

$$TVr = \frac{1}{2}\sum_i |a_i - \tau_{ri}|, TVs = \frac{1}{2}\sum_i |a_i - \tau_{si}| \tag{15}$$

As shown in equation (15), ½ is a standardized item that limits the total variation distance to between 0 and 1.

The allocated mass is the total proportion of reconstructed strings. For simplicity, the present invention uses AMr and AMs to denote the allocated masses for RAPPOR and SPARR, respectively. Formally, AMr and AMs are defined equation (16):

$$AMr = \sum_i \tau_{ri}, AMs = \sum_i \tau_{si} \tag{16}$$

B. Simulation Results

After clarifying the resultant metrics, the present invention first compares SPARR with RAPPOR over a sequence of simulations and separates the experiments into two parts.

In the first part, the present invention varies the parameters k, m and N, which influence the accuracy of SPARR and RAPPOR but do not affect the degree of privacy protection. More specifically, the present invention fixes ε=4, which is relatively loose for both mechanisms. Therefore, the present invention can faithfully observe the impact of these parameters on the accuracy of estimation. In the second part, the present invention sets k=8, m=56, and N=1,000,000, which are evidenced as an optimal case for SPARR and RAPPOR in the first part. Then, the present invention varies ε from 1 to 4 through tuning the parameters h, f, p, and q, and apply different distributions to observe the impacts of different privacy degrees.

Figure 5A:
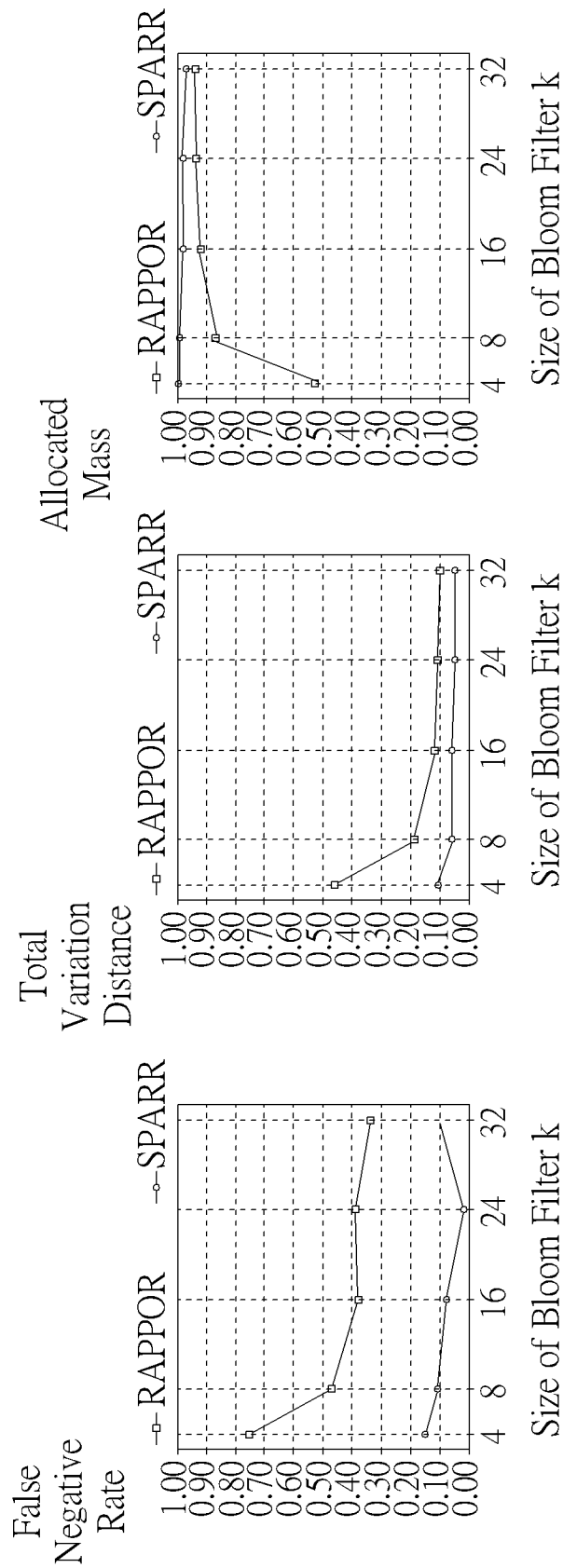
FIGS. 5A-5C are diagrams illustrating comparison of the false negative rate, total variation distance, and allocated mass in varying k, m, and N.
Figure 5B:
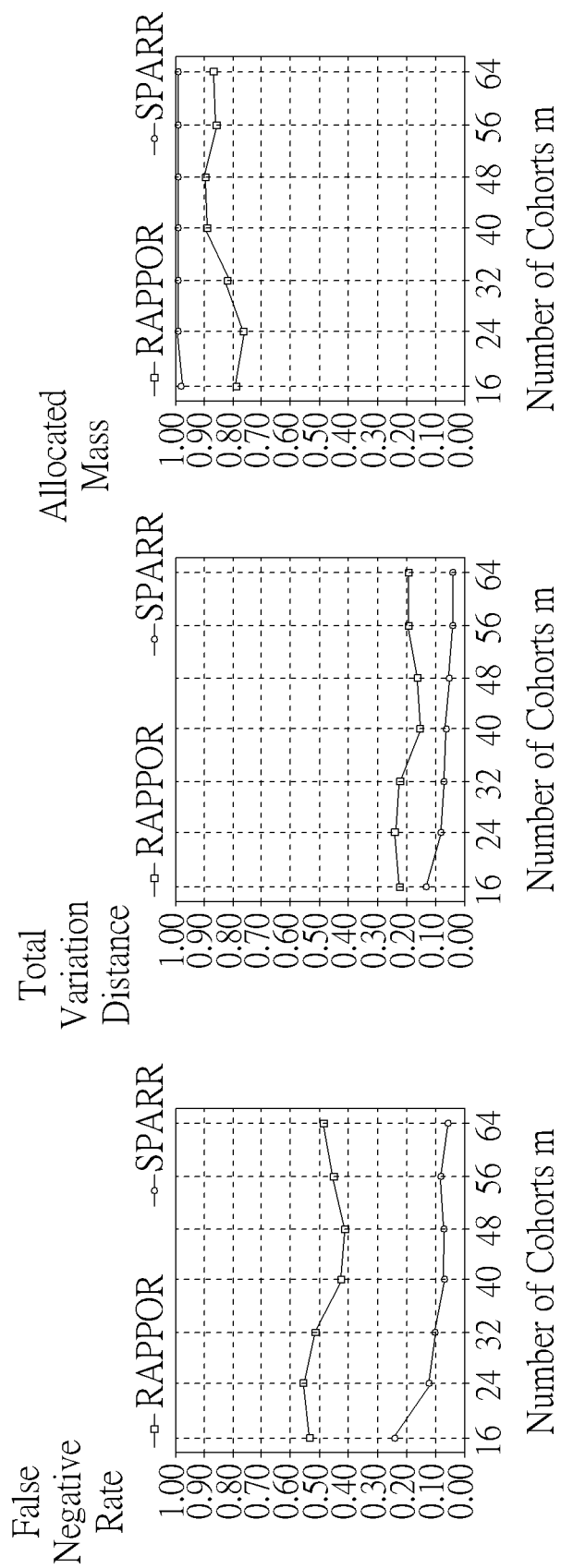
Figure 5C:
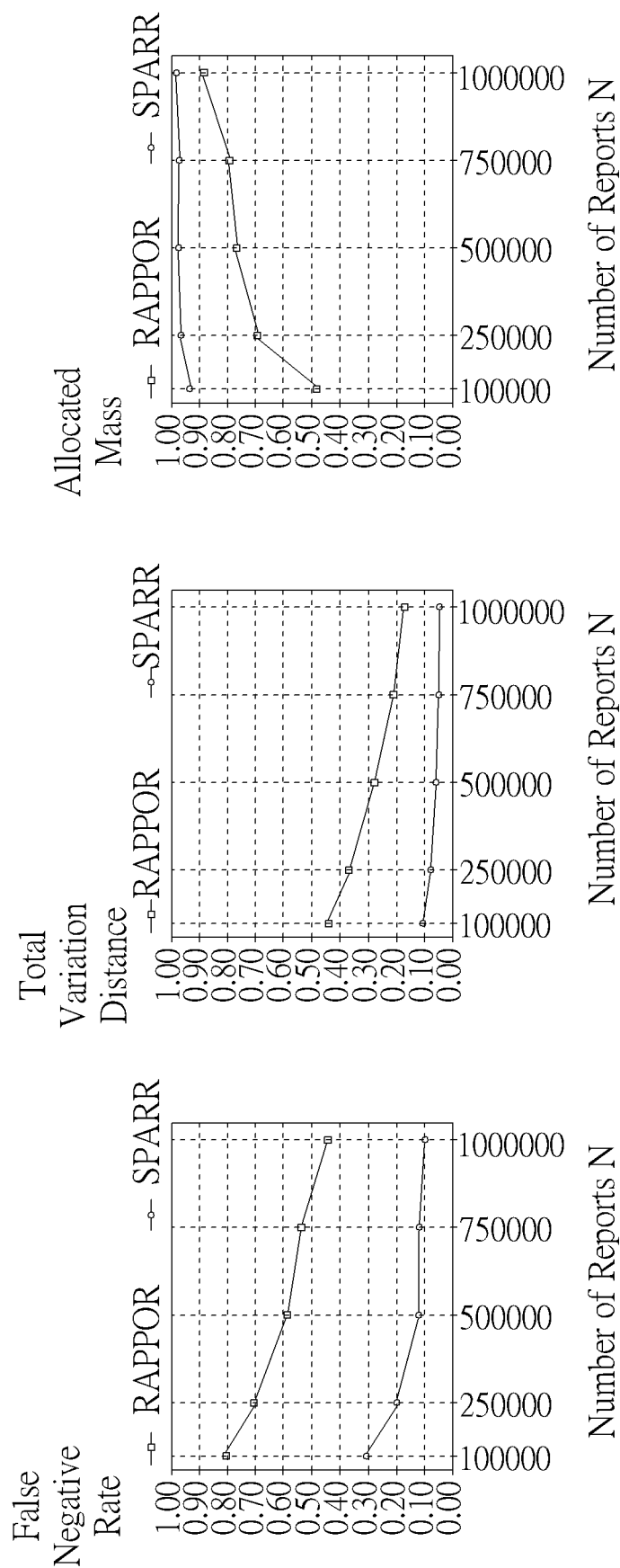

1) The Impacts of Varying k, m, and N:

the test cases and their experimental results are shown in Table III and FIGS. 5A-5C. Due to the limit of space, the present invention only shows the key results based on normal distribution, but this does not prevent the present invention from explaining the generality.

TABLE III

RESULTANT METRICS (FALSE NEGATIVE RATE, TOTAL VARIATION DISTANCE, AND ALLOCATED MASS) FOR SIMULATIONS UNDER DIFFERENT k, m, AND N

| Test Case | Result Metrics | | | | | | | | | | | |
|---|---|---|---|---|---|---|---|---|---|---|---|---|
| | $R_r$ | $R_s$ | ΔR | $FN_r$ | $FN_s$ | ΔFN | $TV_r$ | $TV_s$ | ΔTV | $AM_r$ | $AM_s$ | ΔAM |
| (a) | | | | | | | | | | | | |
| k = 4 | 25 | 85 | 60 | 0.75 | 0.15 | −0.6 | 0.46 | 0.11 | −0.35 | 0.53 | 0.99 | 0.46 |
| k = 8 | 53 | 89 | 36 | 0.47 | 0.11 | −0.36 | 0.19 | 0.06 | −0.14 | 0.87 | 0.99 | 0.12 |
| k = 16 | 62 | 92 | 30 | 0.38 | 0.18 | −0.3 | 0.12 | 0.06 | −0.07 | 0.92 | 0.98 | 0.06 |
| k = 24 | 61 | 98 | 37 | 0.39 | 0.02 | −0.37 | 0.11 | 0.05 | −0.06 | 0.93 | 0.98 | 0.05 |
| k = 32 | 66 | 90 | 24 | 0.34 | 0.1 | −0.24 | 0.1 | 0.05 | −0.05 | 0.94 | 0.97 | 0.02 |
| Mean | 53 | 91 | 37 | 0.47 | 0.09 | −0.37 | 0.2 | 0.07 | −0.13 | 0.84 | 0.98 | 0.14 |
| | ±2 | ±1 | ±3 | ±0.02 | ±0.01 | ±0.03 | ±0.01 | ±0.01 | ±0.02 | ±0.03 | ±0.04 | ±0.07 |
| (b) | | | | | | | | | | | | |
| m = 16 | 46 | 75 | 29 | 0.54 | 0.25 | −0.29 | 0.23 | 0.14 | −0.1 | 0.79 | 0.98 | 0.19 |
| m = 24 | 77 | 87 | 43 | 0.56 | 0.13 | −0.43 | 0.25 | 0.09 | −0.16 | 0.77 | 0.99 | 0.22 |

TABLE III-continued

RESULTANT METRICS (FALSE NEGATIVE RATE, TOTAL VARIATION DISTANCE, AND ALLOCATED MASS) FOR SIMULATIONS UNDER DIFFERENT k, m, AND N

| Test Case | $R_r$ | $R_s$ | $\Delta R$ | $FN_r$ | $FN_s$ | $\Delta FN$ | $TV_r$ | $TV_s$ | $\Delta TV$ | $AM_r$ | $AM_s$ | $\Delta AM$ |
|---|---|---|---|---|---|---|---|---|---|---|---|---|
| m = 32 | 48 | 89 | 41 | 0.52 | 0.11 | −0.41 | 0.23 | 0.08 | −0.15 | 0.82 | 0.99 | 0.18 |
| m = 40 | 57 | 92 | 35 | 0.43 | 0.08 | −0.35 | 0.16 | 0.07 | −0.10 | 0.89 | 0.99 | 0.10 |
| m = 48 | 58 | 92 | 34 | 0.42 | 0.08 | −0.34 | 0.17 | 0.06 | −0.11 | 0.90 | 0.99 | 0.09 |
| m = 56 | 54 | 91 | 37 | 0.46 | 0.09 | −0.37 | 0.20 | 0.05 | −0.14 | 0.86 | 0.99 | 0.12 |
| m = 64 | 51 | 93 | 42 | 0.49 | 0.07 | −0.42 | 0.20 | 0.05 | −0.15 | 0.87 | 0.99 | 0.12 |
| Mean | 51 | 88 | 37 | 0.49 | 0.12 | −0.37 | 0.21 | 0.08 | −0.13 | 0.84 | 0.99 | 0.15 |
|  | ±2 | ±1 | ±3 | ±0.02 | ±0.01 | ±0.03 | ±0.01 | ±0.00 | ±0.01 | ±0.03 | ±0.04 | ±0.07 |
| (c) | | | | | | | | | | | | |
| N = 100000 | 19 | 69 | 50 | 0.81 | 0.31 | −0.50 | 0.44 | 0.11 | −0.32 | 0.49 | 0.94 | 0.45 |
| N = 250000 | 29 | 80 | 51 | 0.71 | 0.20 | −0.51 | 0.37 | 0.08 | −0.29 | 0.70 | 0.97 | 0.27 |
| N = 500000 | 41 | 88 | 47 | 0.59 | 0.12 | −0.47 | 0.28 | 0.06 | −0.22 | 0.77 | 0.98 | 0.22 |
| N = 750000 | 46 | 88 | 42 | 0.54 | 0.12 | −0.42 | 0.21 | 0.05 | −0.16 | 0.80 | 0.98 | 0.18 |
| N = 1000000 | 55 | 90 | 35 | 0.45 | 0.10 | −0.35 | 0.17 | 0.05 | −0.12 | 0.89 | 0.99 | 0.10 |
| Mean | 38 | 83 | 45 | 0.62 | 0.17 | −0.45 | 0.29 | 0.07 | −0.22 | 0.73 | 0.97 | 0.24 |
|  | ±3 | ±1 | ±4 | ±0.03 | ±0.01 | ±0.04 | ±0.01 | ±0.00 | ±0.01 | ±0.03 | ±0.04 | ±0.07 |

In case (a), the present invention sets k varying from 4 to 32. Compared to RAPPOR, SPARR can reduce the false negative rate and the total variation distance by around 37% and 13% on average, respectively. Also, SPARR can increase the allocated mass by around 14% on average. In particular, the advantages of SPARR become more apparent as k gradually decreased. This means that SPARR can still achieve well accuracy of data prediction in a harsh network with less bandwidth.

The number of cohorts m will impact the collision probability of two strings in the Bloom filter. To guarantee accuracy, there is a trade-off between N and m. In case (b), when m varies from 16 to 64, SPARR can significantly reduce the false negative rate and the total variation distance by around 37% and 13% on average, respectively, while maintaining the allocated mass at approximately 1.

In case (c), it demonstrates the relationship between the number of reconstructed strings and the number of reports N. Compared to RAPPOR, SPARR can significantly reduce the false negative rate, the total variation distance, and the allocated mass by around 45%, 22%, and 24% on average, respectively. This shows that SPARR can use a small amount of data to accurately estimate the distribution of unique client side strings. Specifically, SPARR can be applied to general platforms even for small collections.

Figure 6A:
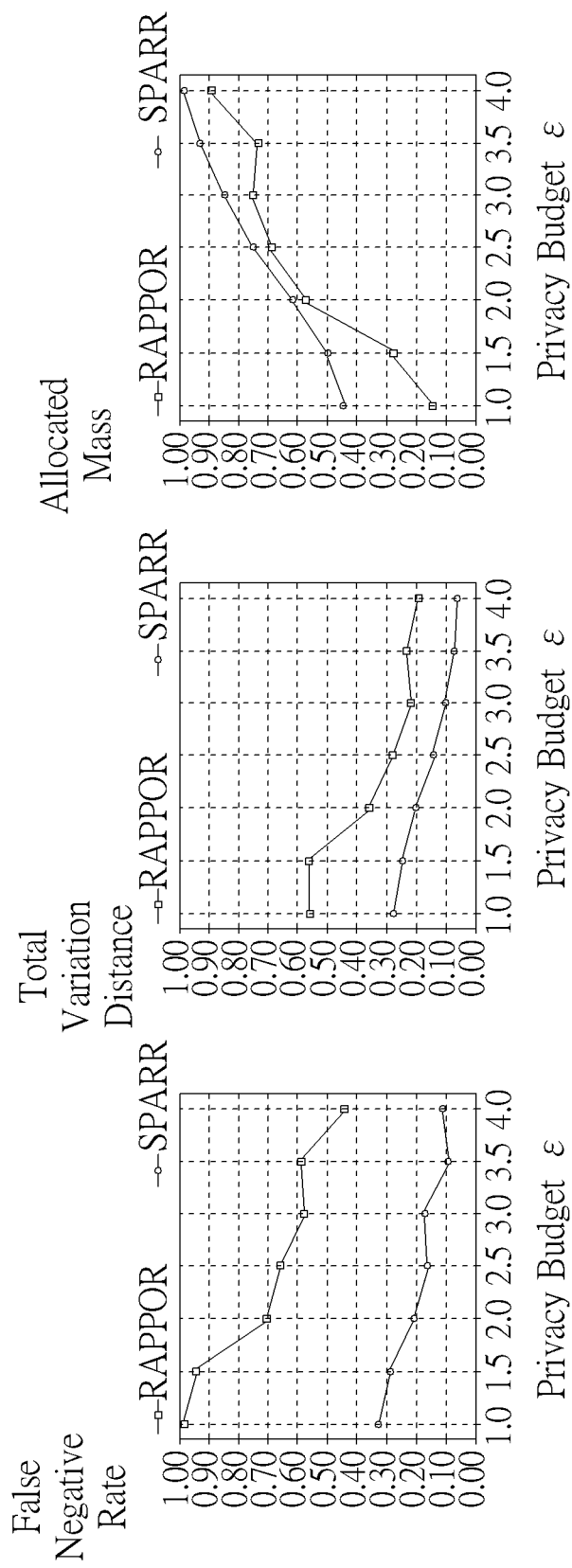
FIGS. 6A-6C are diagrams illustrating comparison of the false negative rate, total variation distance, and allocated mass in varying $\varepsilon$.
Figure 6B:
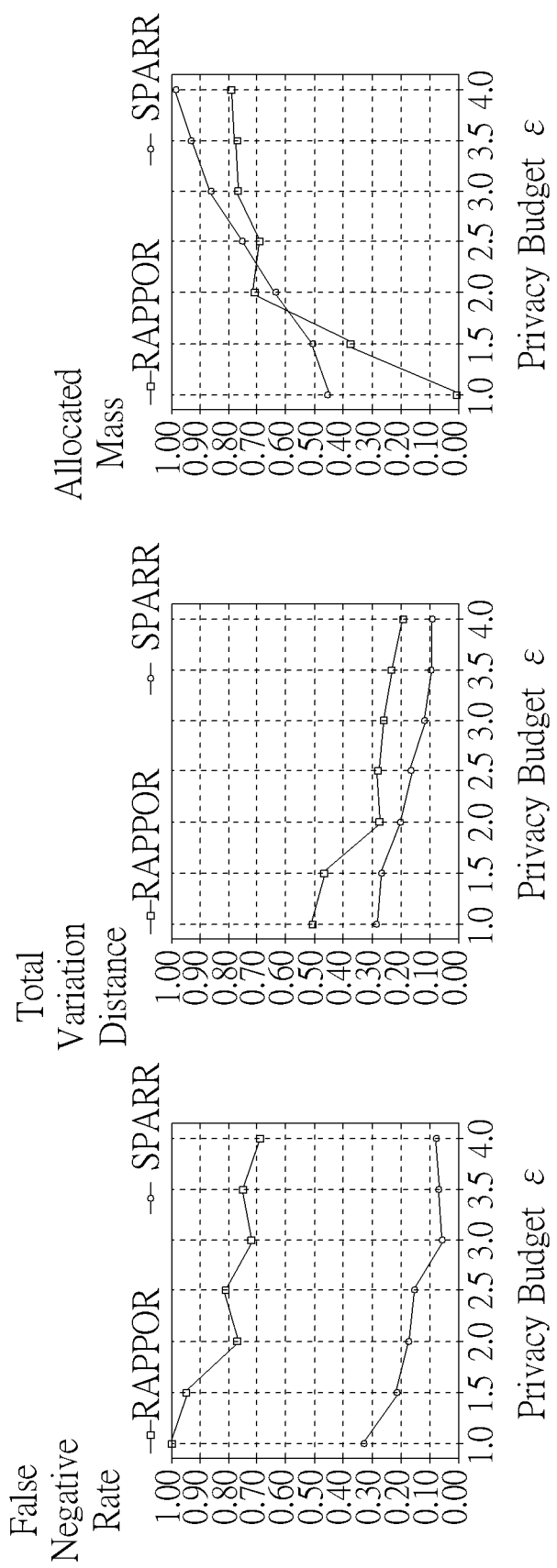
Figure 6C:
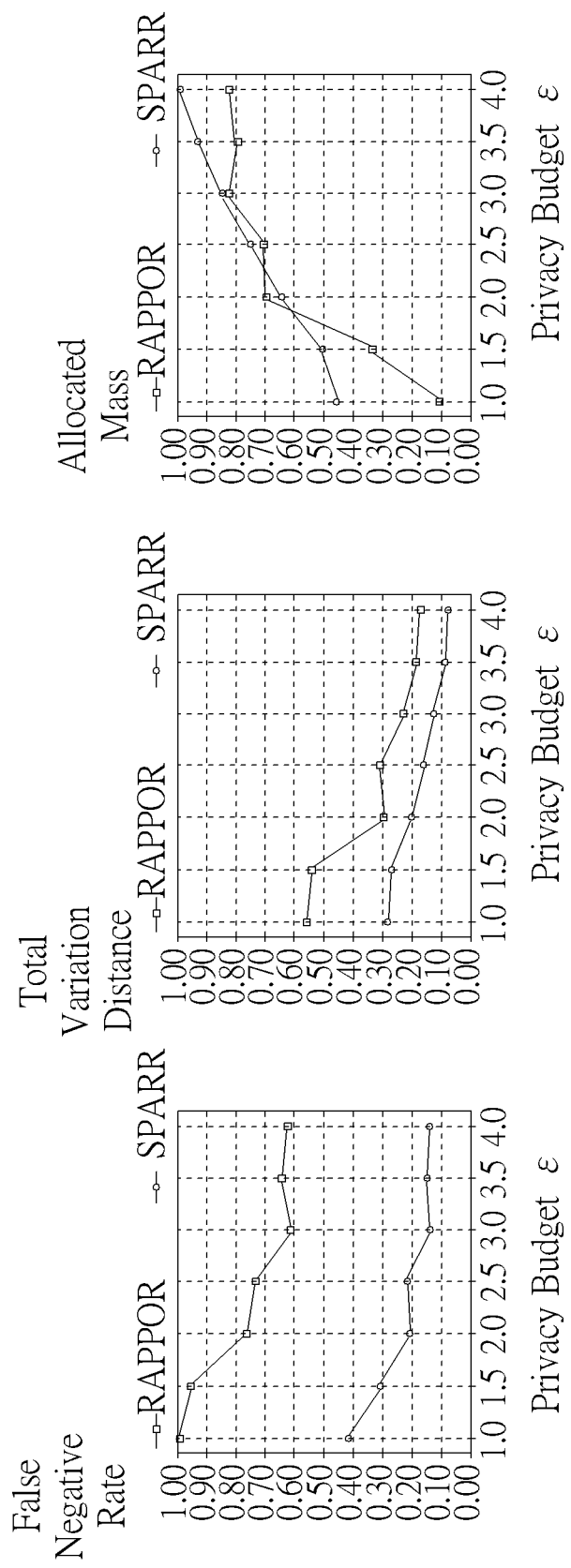

2) The Impact of Varying ε:

The present invention demonstrates the impact of varying ε from 1 to 4 for different distributions in Table IV and FIGS. 6A-6C while setting k=8, m=56 and N=1,000,000. Compared to RAPPOR, SPARR can improve 51%, 20%, and 18% for the false negative rate, the total variation distance, and the allocated mass on average, respectively, if the underlying distribution of the strings' frequencies is a normal distribution. When the underlying distribution of the strings' frequencies is a zipfl distribution, SPARR can improve 67%, 16%, and 17% for the false negative rate, the total variation distance, and the allocated mass on average, respectively. When the underlying distribution of the strings' frequencies is an exponential distribution, SPARR can improve 55%, 17%, and 15% for the false negative rate, the total variation distance, and the allocated mass on average, respectively. Apparently, SPARR can outperform RAPPOR on these metrics, regardless of the distributions.

TABLE IV

RESULTANT METRICS (FALSE NEGATIVE RATE, TOTAL VARIATION DISTANCE, AND ALLOCATED MASS) FOR SIMULATIONS UNDER DIFFERENT ε

| Test Case (Normal Distribution) | $R_r$ | $R_s$ | $\Delta R$ | $FN_r$ | $FN_s$ | $\Delta FN$ | $TV_r$ | $TV_s$ | $\Delta TV$ | $AM_r$ | $AM_s$ | $\Delta AM$ |
|---|---|---|---|---|---|---|---|---|---|---|---|---|
| (a) | | | | | | | | | | | | |
| ε = 1 | 1 | 69 | 68 | 0.99 | 0.31 | −0.68 | 0.56 | 0.17 | −0.39 | 0.14 | 0.67 | 0.54 |
| ε = 1.5 | 5 | 71 | 66 | 0.95 | 0.29 | −0.66 | 0.56 | 0.25 | −0.31 | 0.27 | 0.50 | 0.23 |
| ε = 2 | 29 | 79 | 50 | 0.71 | 0.21 | −0.50 | 0.36 | 0.20 | −0.16 | 0.58 | 0.62 | 0.05 |
| ε = 2.5 | 34 | 84 | 50 | 0.66 | 0.16 | −0.50 | 0.28 | 0.14 | −0.14 | 0.69 | 0.75 | 0.06 |
| ε = 3 | 42 | 83 | 41 | 0.58 | 0.17 | −0.41 | 0.22 | 0.10 | −0.13 | 0.75 | 0.85 | 0.11 |
| ε = 3.5 | 41 | 91 | 50 | 0.59 | 0.09 | −0.50 | 0.23 | 0.07 | −0.15 | 0.74 | 0.93 | 0.18 |
| ε = 4 | 56 | 89 | 33 | 0.44 | 0.11 | −0.33 | 0.19 | 0.06 | −0.12 | 0.90 | 0.99 | 0.10 |
| Mean | 30 | 81 | 51 | 0.70 | 0.19 | −0.51 | 0.34 | 0.14 | −0.20 | 0.58 | 0.76 | 0.18 |
|  | ±3 | ±1 | ±4 | ±0.03 | ±0.01 | ±0.04 | ±0.01 | ±0.01 | ±0.02 | ±0.02 | ±0.03 | ±0.05 |

TABLE IV-continued

RESULTANT METRICS (FALSE NEGATIVE RATE, TOTAL VARIATION DISTANCE, AND ALLOCATED MASS) FOR SIMULATIONS UNDER DIFFERENT ε

| Test Case (Normal Distribution) | Result Metrics | | | | | | | | | | | |
|---|---|---|---|---|---|---|---|---|---|---|---|---|
| | $R_r$ | $R_s$ | $\Delta R$ | $FN_r$ | $FN_s$ | $\Delta FN$ | $TV_r$ | $TV_s$ | $\Delta TV$ | $AM_r$ | $AM_s$ | $\Delta AM$ |
| (b) | | | | | | | | | | | | |
| ε = 1   | 0  | 68 | 68 | 1.00 | 0.32 | −0.68 | 0.50 | 0.18 | −0.32 | 0.00 | 0.66 | 0.66 |
| ε = 1.5 | 5  | 79 | 74 | 0.95 | 0.21 | −0.74 | 0.46 | 0.26 | −0.21 | 0.37 | 0.50 | 0.13 |
| ε = 2   | 23 | 83 | 60 | 0.77 | 0.17 | −0.60 | 0.27 | 0.20 | −0.08 | 0.71 | 0.63 | −0.08 |
| ε = 2.5 | 19 | 85 | 66 | 0.81 | 0.15 | −0.66 | 0.28 | 0.16 | −0.13 | 0.69 | 0.75 | 0.06 |
| ε = 3   | 28 | 95 | 67 | 0.72 | 0.05 | −0.67 | 0.25 | 0.11 | −0.14 | 0.77 | 0.86 | 0.08 |
| ε = 3.5 | 25 | 94 | 69 | 0.75 | 0.06 | −0.69 | 0.23 | 0.09 | −0.14 | 0.77 | 0.93 | 0.16 |
| ε = 4   | 31 | 93 | 62 | 0.69 | 0.07 | −0.62 | 0.19 | 0.09 | −0.10 | 0.79 | 0.99 | 0.20 |
| Mean    | 19 | 85 | 66 | 0.81 | 0.15 | −0.67 | 0.31 | 0.15 | −0.16 | 0.59 | 0.76 | 0.17 |
|         | ±3 | ±1 | ±4 | ±0.03 | ±0.01 | ±0.04 | ±0.01 | ±0.01 | ±0.02 | ±0.02 | 0.03 | ±0.05 |
| (c) | | | | | | | | | | | | |
| ε = 1   | 1  | 63 | 62 | 0.99 | 0.37 | −0.62 | 0.55 | 0.18 | −0.37 | 0.10 | 0.68 | 0.58 |
| ε = 1.5 | 5  | 70 | 65 | 0.95 | 0.30 | −0.65 | 0.54 | 0.26 | −0.28 | 0.33 | 0.50 | 0.17 |
| ε = 2   | 24 | 80 | 56 | 0.76 | 0.20 | −0.56 | 0.29 | 0.19 | −0.10 | 0.69 | 0.64 | −0.06 |
| ε = 2.5 | 27 | 79 | 52 | 0.73 | 0.21 | −0.52 | 0.30 | 0.15 | −0.15 | 0.70 | 0.74 | 0.05 |
| ε = 3   | 39 | 87 | 48 | 0.61 | 0.13 | −0.48 | 0.22 | 0.12 | −0.10 | 0.82 | 0.85 | 0.03 |
| ε = 3.5 | 36 | 86 | 50 | 0.64 | 0.14 | −0.50 | 0.18 | 0.08 | −0.09 | 0.79 | 0.93 | 0.14 |
| ε = 4   | 38 | 87 | 49 | 0.62 | 0.13 | −0.49 | 0.16 | 0.07 | −0.08 | 0.82 | 0.99 | 0.18 |
| Mean    | 24 | 79 | 55 | 0.76 | 0.21 | −0.55 | 0.32 | 0.15 | −0.17 | 0.61 | 0.76 | 0.15 |
|         | ±3 | ±1 | ±4 | ±0.03 | ±0.01 | ±0.04 | ±0.01 | ±0.01 | ±0.02 | ±0.03 | ±0.03 | ±0.06 |

Figure 7A:
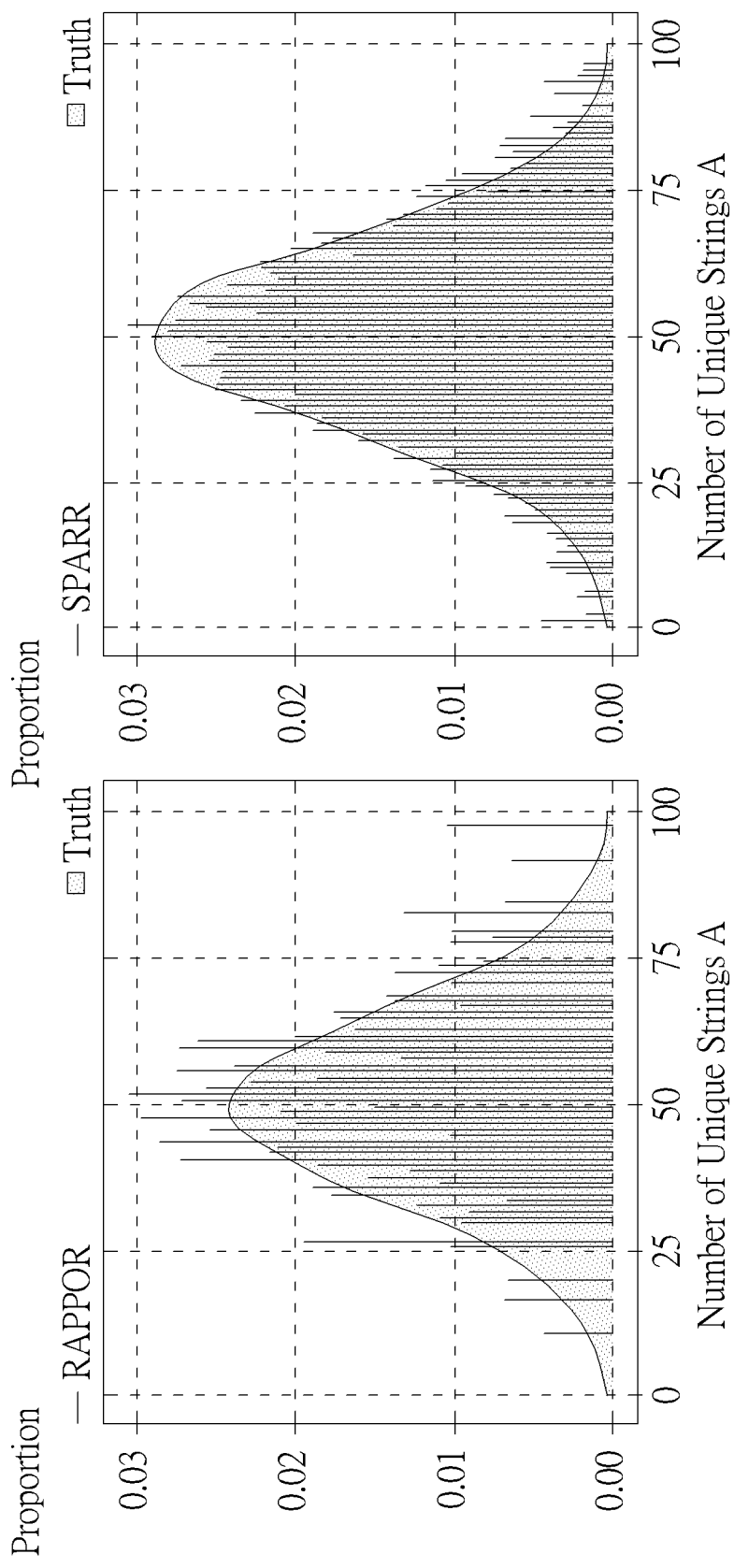
FIGS. 7A-7C are diagrams illustrating population of client-side strings reconstructed by SPARR and RAPPOR when using (a) normal distribution, (b) zipfl distribution, and (c) exponential distribution at $\varepsilon=4$, respectively.
Figure 7B:
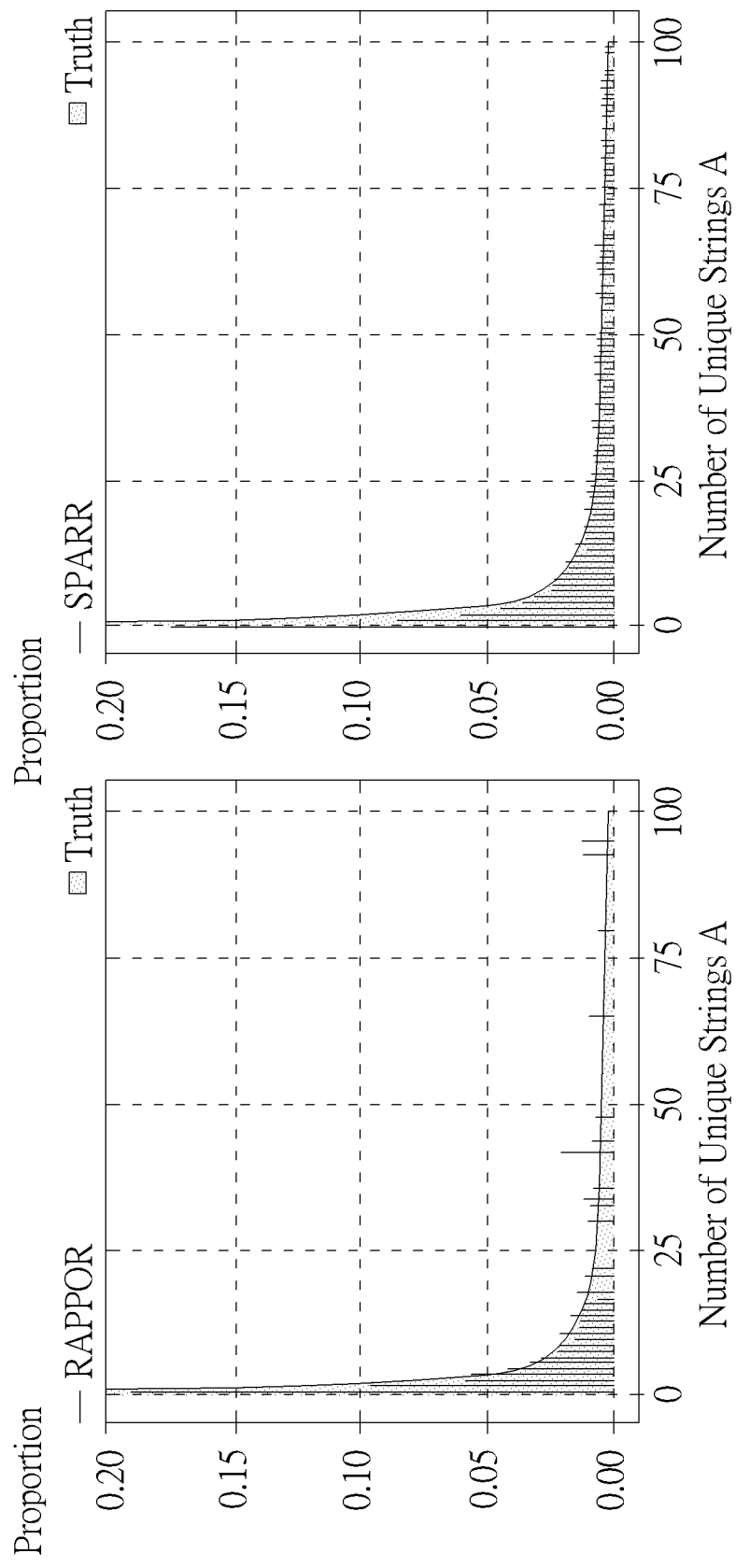
Figure 7C:
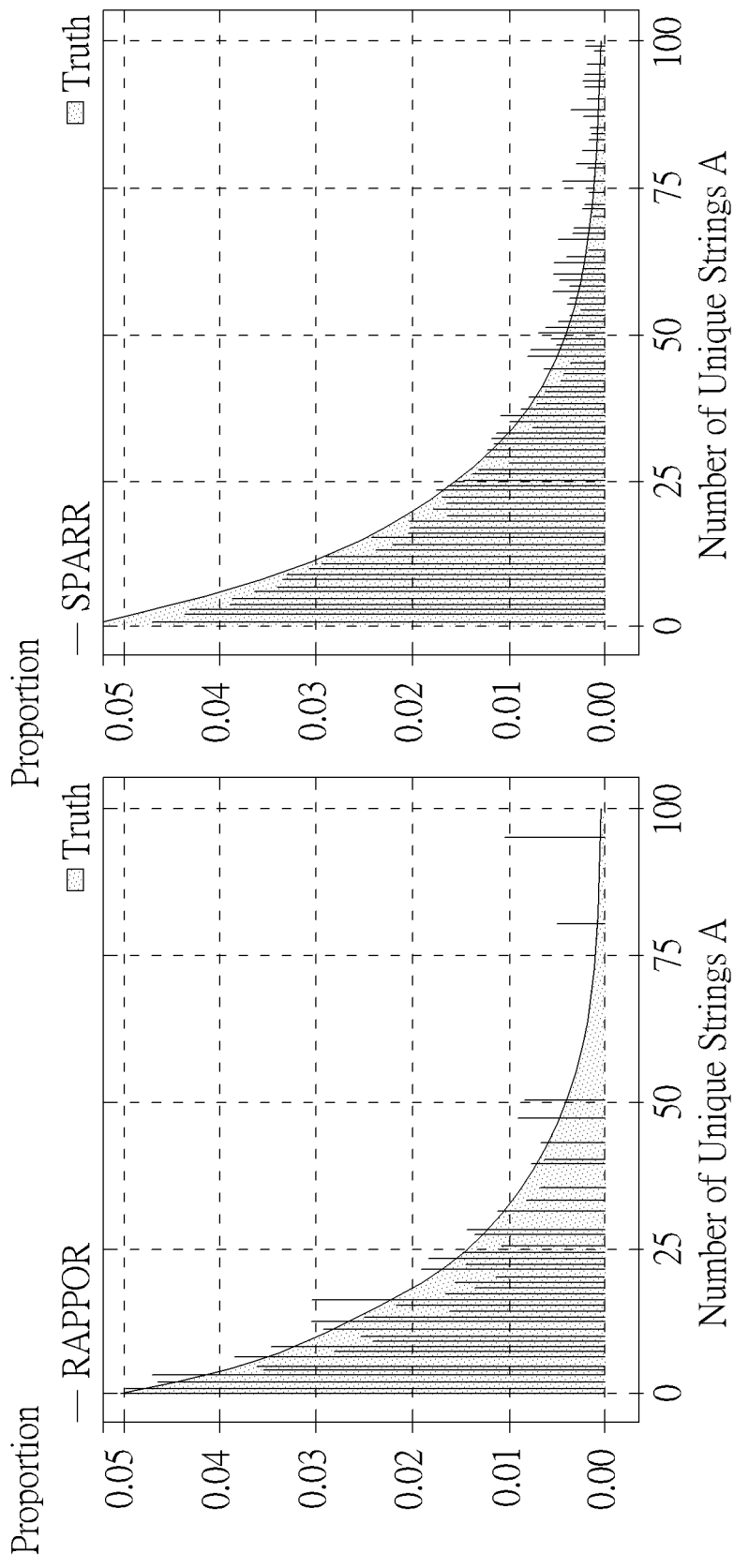

More intuitively, the present invention evaluates the population in three distributions (i.e., normal, zipfl, and exponential) of the client side strings with their true frequencies on the vertical axis by comparing SPARR with RAPPOR, as demonstrated in FIGS. 7A-7C providing k=32, m=64, and N=1,000,000 at ε=4. Notably, for fairly comparing SPARR with RAPPOR, the present invention selects ε=4 which is optimal case for SPARR and RAPPOR in this evaluation. According to FIGS. 7A-7C, SPARR significantly improves the detection of client-side strings for the low frequencies compared with RAPPOR while maintaining high reconstruction of collected strings.

C. Real-World Results

In addition to the simulated data, the present invention also runs SPARR and RAPPOR on a real-world dataset. Specifically, this dataset is from "Frequent Itemset Mining Dataset Repository", called Kosarak, which is provided by Ferenc Bodon [1]. Kosarak records about 990,000 reports of click action involving 41,270 different pages, and the web masters may want to know the popularity of each page through the estimation of clicks. Without loss of generality, the present invention only cares about 100 most visited pages. Similar to the settings in the previous section, the present invention fixes k=8 and m=56, and ε varied from 1 to 4, experimenting at each interval of 0.5.

Due to the limitations of randomized response and statistical inference, the present invention still needs a large amount of reports to find the unique pages and its clicks. This is also the trade-off between privacy and utility, which is mentioned in the related literatures [7] [13]. However, as demonstrated later, the present invention can achieve better privacy while recovering more pages that have lower click through rate (CTR).

Figure 8:
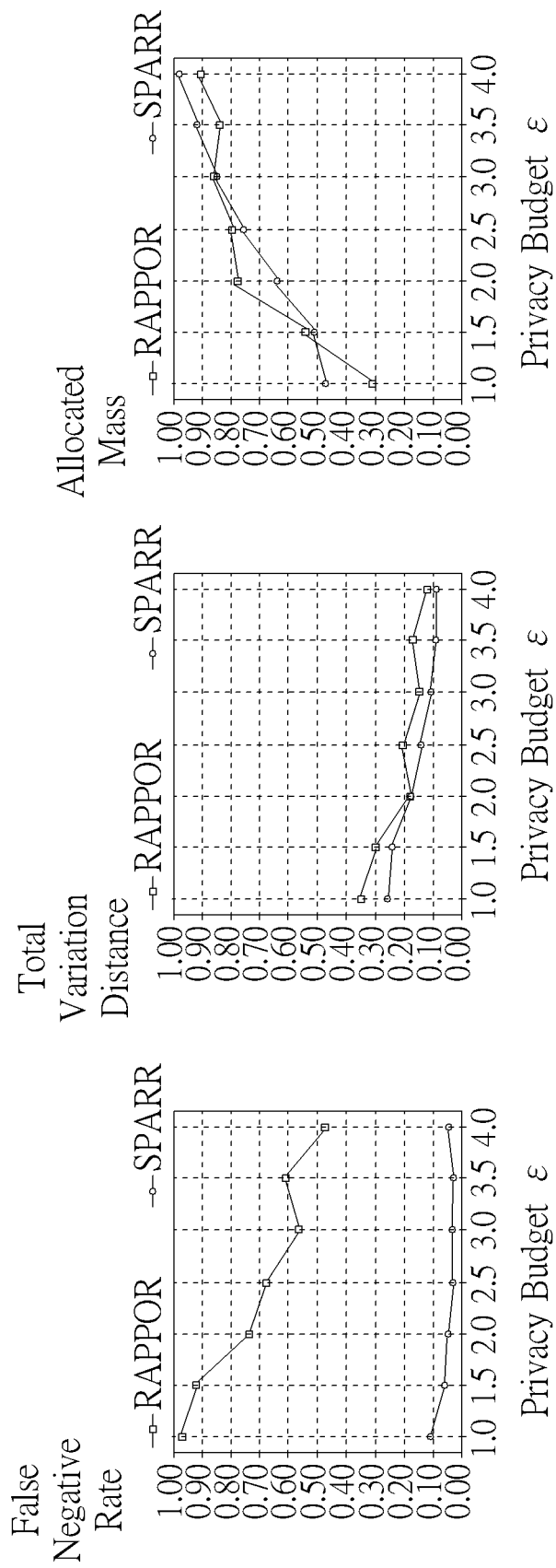
FIG. 8 is a diagram illustrating comparison of SPARR and RAPPOR when using Kosarak under different $\varepsilon$.
Figure 9:
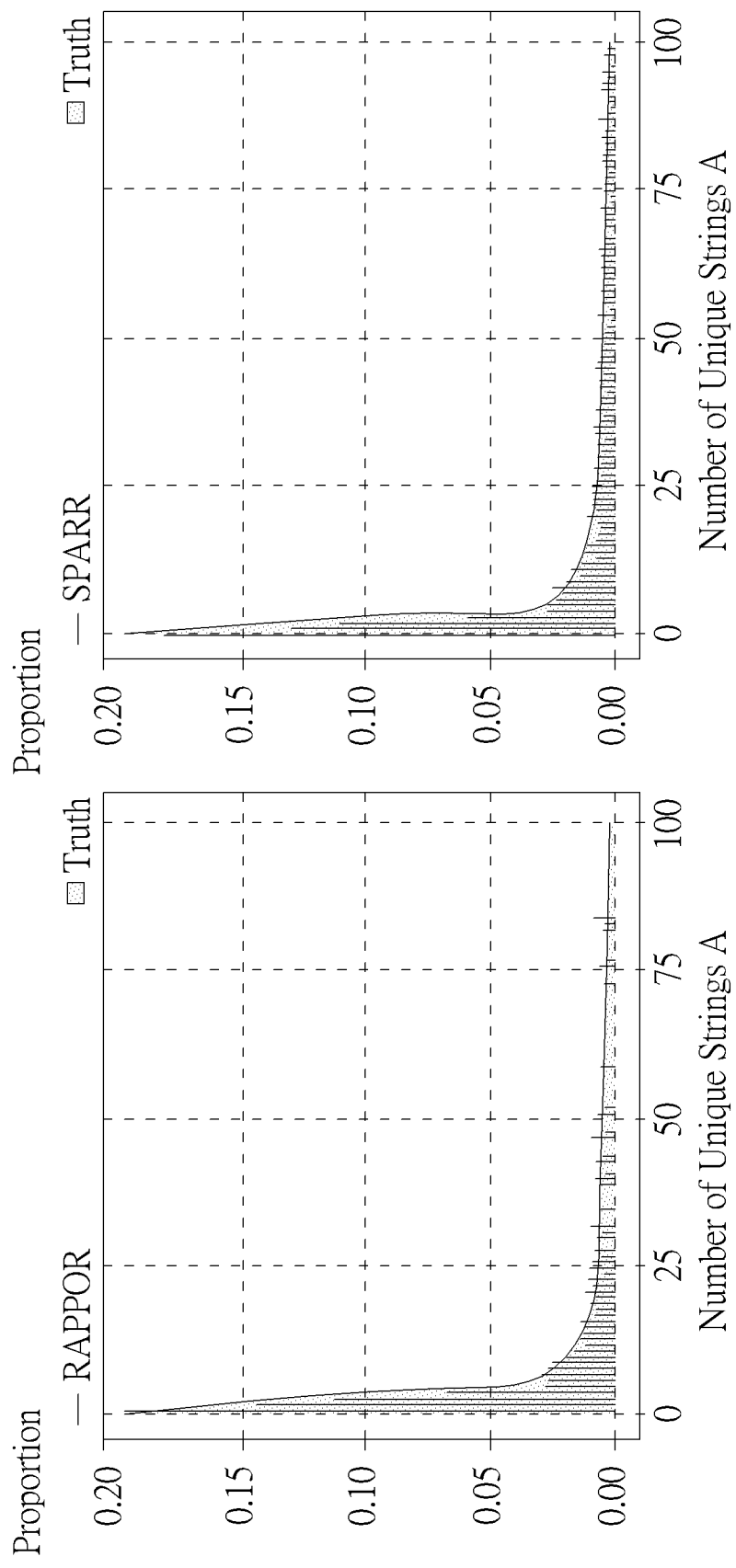
FIG. 9 is a diagram illustrating population of client-side strings reconstructed by SPARR and RAPPOR when using Kosarak dataset at $\varepsilon=4$.

The experimental results are shown in Table V and plotted in FIG. 8. It is clearly seen that under the same ε, SPARR has lower false negative rate and total variation distance than RAPPOR with lightly sacrificing allocated mass. The advantages of SPARR become more apparent as ε decreases. The present invention can see more apparently in FIG. 9, which shows the population of client-side strings reconstructed by SPARR and RAPPOR when using Kosarak dataset at ε=4. It is worth noting that while focusing on high CTR pages, the present invention should not overlook websites that have vital meaning but in the long tail, such as those for specialized topics or for specific groups of people. It can be seen that SPARR is better than RAPPOR in fairness since it can recover almost all the pages independent of CTR.

TABLE V

RESULTANT METRICS (FALSE NEGATIVE RATE, TOTAL VARIATION DISTANCE, AND ALLOCATED MASS) FOR REAL-WORLD CASE UNDER DIFFERENT ε

| Test Case (Normal Distribution) | Result Metrics | | | | | | | | | | | |
|---|---|---|---|---|---|---|---|---|---|---|---|---|
| | $R_r$ | $R_s$ | $\Delta R$ | $FN_r$ | $FN_s$ | $\Delta FN$ | $TV_r$ | $TV_s$ | $\Delta TV$ | $AM_r$ | $AM_s$ | $\Delta AM$ |
| ε = 1   | 3  | 89 | 86 | 0.97 | 0.11 | −0.86 | 0.34 | 0.26 | −0.08 | 0.31 | 0.47 | 0.16 |
| ε = 1.5 | 8  | 94 | 86 | 0.92 | 0.06 | −0.86 | 0.30 | 0.25 | −0.05 | 0.54 | 0.51 | −0.03 |
| ε = 2   | 26 | 95 | 69 | 0.74 | 0.05 | −0.69 | 0.18 | 0.18 | 0.00 | 0.78 | 0.64 | −0.14 |
| ε = 2.5 | 32 | 97 | 65 | 0.68 | 0.03 | −0.65 | 0.20 | 0.14 | −0.06 | 0.80 | 0.76 | −0.04 |
| ε = 3   | 43 | 97 | 54 | 0.57 | 0.03 | −0.54 | 0.15 | 0.11 | −0.04 | 0.86 | 0.85 | −0.01 |

TABLE V-continued

RESULTANT METRICS (FALSE NEGATIVE RATE, TOTAL VARIATION DISTANCE, AND ALLOCATED MASS) FOR REAL-WORLD CASE UNDER DIFFERENT $\varepsilon$

| Test Case (Normal Distribution) | Result Metrics | | | | | | | | | | | |
|---|---|---|---|---|---|---|---|---|---|---|---|---|
| | $R_r$ | $R_s$ | $\Delta R$ | $FN_r$ | $FN_s$ | $\Delta FN$ | $TV_r$ | $TV_s$ | $\Delta TV$ | $AM_r$ | $AM_s$ | $\Delta AM$ |
| $\varepsilon = 3.5$ | 39 | 97 | 58 | 0.61 | 0.03 | −0.58 | 0.17 | 0.09 | −0.08 | 0.84 | 0.92 | 0.08 |
| $\varepsilon = 4$ | 53 | 95 | 42 | 0.47 | 0.05 | −0.42 | 0.12 | 0.09 | −0.03 | 0.91 | 0.98 | 0.07 |
| Mean | 29 | 95 | 66 | 0.71 | 0.05 | −0.66 | 0.21 | 0.16 | −0.05 | 0.72 | 0.73 | 0.01 |
| | ±3 | ±1 | ±4 | ±0.02 | ±0.01 | ±0.03 | ±0.01 | ±0.01 | ±0.02 | ±0.03 | 0.03 | ±0.06 |

CONCLUSIONS

SPARR is a practical data protection mechanism based on physical events from MTJs for crowdsourced data collection with a high-utility and mathematically rigorous privacy guarantee. It employs a set of MTJs as a spintronics-based TRNG to derive true random numbers. With the spintronics-based TRNG and design of four coin flips, SPARR can preserve privacy and crowdsource population statistics on data collected from individuals and accurately decode this data. Also, the present invention will apply deep learning techniques in the present invention for in-memory computing to improve the efficiency and accuracy of data analysis, and design the present invention to adapt to most data analysis applications.

REFERENCE

[1] Kosarak. Available at http://fimi.ua.ac.be/data/.
[2] A. Rukhin, J. Soto, J. Nechvatal, M. Smid, E. Barker, S. Leigh, M. Levenson, M. Vangel, D. Banks, A. Heckert, J. Dray, and S. Vo, "A Statistical Test Suite for Random and Pseudorandom Number Generators for Cryptographic Applications," National Institute of Standards and Technology (NIST), Special Publication 800-22 Revision 1. Available at http://csrc.nist.gov/publications/PubsSPs.html, 2008.
[3] A. Fukushima, T. Seki, K. Yakushiji, H. Kubota, H. Imamura, S. Yuasa, and K. Ando, "Spindice: A Scalable Truly Random Number Generator Based on Spintronics," in Journal of Applied Physics Express, vol. 7, no. 8, pp. 083001, 2014.
[4] B. Edwards, S. Hofmeyr, S. Forrest, and M. V. Eeten, "Analyzing and Modeling Longitudinal Security Data: Promise and Pitfalls," in Proceedings of the 31st Annual Computer Security Applications Conference, pp. 391-400, 2015.
[5] B. H. Bloom, "Space/Time Trade-offs in Hash Coding with Allowable Errors," Communications of the ACM, vol. 13, no. 7, pp. 422-426, 1970.
[6] C. Dwork, "Differential Privacy," in Proceedings of the 33rd International Colloquium on Automata, Languages and Programming, pp. 1-12, 2006.
[7] C. Dwork, F. McSherry, K. Nissim, and A. Smith, "Calibrating Noise to Sensitivity in Private Data Analysis," in 3rd Theory of Cryptography Conference, pp. 265-284, 2006.
[8] C. Wang, K. Ren, S. Yu, and K. M. R. Urs, "Achieving Usable and Privacy assured Similarity Search over Outsourced Cloud Data," in Proceedings of IEEE International Conference on Computer Communications, pp. 451-459, 2012.
[9] D. J. Bernstein, "ChaCha, a Variant of Salsa20." Available at http://cr.yp.to/chacha.html, 2008.
[10] E. Stefanov, C. Papamanthou, and E. Shi, "Practical Dynamic Searchable Encryption with Small Leakage," in Proceedings of Network Distribution System Security Symposium, 832-848, 2014.
[11] G. Fanti, V. Pihur, U. Erlingsson, "Building a RAPPOR with the Unknown: Privacy-Preserving Learning of Associations and Data Dictionaries," in Proceedings on Privacy Enhancing Technologies, pp. 41-61, 2016.
[12] J. D. Harms, F. Ebrahimi, X. Yao, and J. P. Wang, "SPICE Macromodel of Spin-Torque-Transfer-Operated Magnetic Tunnel Junctions," in IEEE Transactions on Electron Devices, vol. 57, no. 7, pp. 1425-1430, 2010.
[13] N. Papernot, M. Abadi, U. Erlingsson, I. Goodfellow, and K. Talwar, "Semi-Supervised Knowledge Transfer for Deep Learning from Private Training Data," In Proceedings of the 5th International Conference on Learning Representations, to appear, 2017.
[14] R. Bassily, and A. Smith, "Local, Private, Efficient Protocols for Succinct Histograms," in Proceedings of the Forty-Seventh Annual ACM Symposium on Theory of Computing, pp. 127-135, 2015.
[15] R. Chen, A. Reznichenko, P. Francis, and J. Gehrke, "Towards Statistical Queries over Distributed Private User Data," in Proceedings of the 9th USENIX Conference on Networked Systems Design and Implementation, pp. 169-182, 2012.
[16] S. P. Kasiviswanathan, H. K. Lee, K. Nissim, S. Raskhodnikova, and A. Smith, "What Can We Learn Privately?," in SIAM Journal of Computing, vol. 40, no. 3, pp. 793-826, 2011.
[17] S. Warner, "Randomized Response: A Survey Technique for Eliminating Evasive Answer Bias," in Journal of the American Statistical Association, vol. 60, no. 309, pp. 63-69, 1965.
[18] T-H. Chan, E. Shi, and D. Song, "Optimal Lower Bound for Differentially Private Multi-Party Aggregation," in Proceedings of the 20th Annual European conference on Algorithms, pp. 277-288, 2012.
[19] T. Jung, X. Y. Li, Z. Wan, and M. Wan, "Privacy preserving cloud data access with multi-authorities," in Proceedings of IEEE International Conference on Computer Communications, pp. 2625-2633, 2013.
[20] T. Wang, J. Blocki, N. Li, and S. Jha, "Optimizing Locally Differentially Private Protocols," in 26th USENIX Security Symposium, to appear, 2017.
[21] U. Erlingsson, V. Pihur, and A. Korolova, "RAPPOR: Randomized aggregatable privacy-preserving ordinal response," In Proceedings of the ACM SIGSAC Conference on Computer and Communications Security, pp. 1054-1067, 2014.

[22] Y. Sei and A. Ohsuga, "Differential Private Data Collection and Analysis Based on Randomized Multiple Dummies for Untrusted Mobile Crowdsensing," in IEEE Transactions on Information Forensics and Security, vol. 12, no. 4, pp. 926-939, 2017. [23] Z. Qin, Y. Yang, T. Yu, I. Khalil, X. Xiao, and K. Ren, "Heavy Hitter Estimation over Set-Valued Data with Local Differential Privacy," in Proceedings of the ACM SIGSAC Conference on Computer and Communications Security, pp. 192-203, 2016.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data collection and analysis method comprising:
   applying, by an integrated circuit, a first noise step, via a stochastic nature of spin-transfer-torque (STT) switching in magnetic tunnel junctions (MJTs) to multiple positions of an original data stream having an original character to generate a first data stream having a first character based on at least one random number set, and
   applying, by the integrated circuit, a second noise step, via the STT switching in NM's, to multiple positions of the first data stream to generate a second data stream having a second character based on at least one random number set, wherein a first variation between the original character and the first character is greater than a second variation between the original character and the second character, and the first variation and the second variation are calculated based by Hamming distances,
   wherein applying the first noise step comprises:
   applying a permanent randomized response (PRR) to the original data stream based on a first random number set produced by a true random number generator to generate a temporal data stream and
   applying an instantaneous randomized response (IRR) to the temporal data stream based on a second random number set produced by the true random number generator to generate the first data stream, and
   wherein applying the second noise step comprises:
   applying a synthetic randomized response (SRR) to the first data stream based on a third random number set produced by the true random number generator to generate the second data stream.

2. The data collection and analysis method of claim 1, wherein identification information in the original data stream is de-identified after applying the first noise step to the original data stream.

3. The data collection and analysis method of claim 1, further comprising:
   receiving an input data stream and utilizing Hash encoding to the input data stream to generate the original data stream having the original character.

4. A data collection and analysis method comprising:
   applying, by an integrated circuit a first noise step, via a stochastic nature of spin-transfer-torque (SIT) switching in magnetic tunnel junctions (MJTs), to multiple positions of an original data stream having a featured distribution to generate a first data stream having a first distribution based on at least one random number set; and
   applying, by the integrated circuit, a second noise step, via the STT switching in MJTs, to multiple positions of the first data stream to generate a second data stream having a second distribution based on at least one random number set, wherein a first variation between the featured distribution and the first distribution is greater than a second variation between the featured distribution and the second distribution, and the first variation and the second variation are calculated based by Hamming distances,
   wherein applying the first noise step comprises:
   applying a permanent randomized response to the original data stream based on a first random number set produced by a true random number generator to generate a temporal data stream, and
   applying an instantaneous randomized response to the temporal data stream based on a second random number set produced by the true random number generator to generate the first data stream, and
   wherein applying the second noise step comprises:
   applying a synthetic randomized response to the first data stream based on a third random number set produced by the true random number generator to generate the second data stream.

5. The data collection and analysis method of claim 4, wherein identification information in the original data stream is de-identified after applying the first noise step to the original data stream.

6. The data collection and analysis method of claim 4, further comprising:
   receiving input data streams and utilizing Hash encoding to the input data streams to generate the original data stream having the featured distribution.

7. A data collection and analysis device comprising:
   a first processor, which is an integrated circuit, applying a first noise step, via a stochastic nature of spin-transfer-torque (STT) switching in magnetic tunnel junctions (MJTs), to multiple positions of an original data stream having an original character to generate a first data stream having a first character based on at least one random number set;
   a second processor, which is an integrated circuit, applying a second noise step, via the STT switching in MJTs, to multiple positions of the first data stream to generate a second data stream having a second character based on at least one random number set, wherein a first variation between the original character and the first character is greater than a second variation between the original character acid the second character, and the first variation and the second variation are calculated based by Hamming distances; and
   a true random number generator generating a first random number set, a second random number set, and a third random number set,
   wherein the first processor applies a permanent randomized response to the original data stream based on the first random number set to generate a temporal data stream, and applies an instantaneous randomized response to the temporal data stream based on the second random number set to generate the first data stream, and
   wherein the second processor applies a synthetic randomized response to the first data stream based on the third random number set to generate the second data stream.

8. The data collection and analysis device of claim 7, wherein identification information in the original data stream is de-identified after the first processor applies the first noise step to the original data stream.

9. The data collection and analysis device of claim 7, further comprising
- a pre-processor receiving an input data stream and utilizing Hash encoding to the input data stream to generate the original data stream having the original character; and
- an output circuit outputting the second data stream.

10. A data collection and analysis device comprising:
- a true random number generator generating a plurality of random numbers without the need of a seed; and
- a processor unit, which is an integrated circuit, based on the plurality of random numbers, de-identifying identification information in an original data stream having an original character and generating a second data stream having a second character,
- wherein the second character is similar to the original character, and the first data stream is generated by applying a first noise step, via a stochastic nature of spin-transfer-torque (STT) switching in magnetic tunnel junctions (MJTs), to multiple positions of the original data stream, the second data stream is generated by applying a second noise step, via the STT switching in MJTs to multiple positions of the first data stream,
- wherein the plurality of random numbers comprising a first random number set and a second random number set, and the processor unit comprising a first processor; wherein the first processor applies a permanent randomized response to the original data stream based on the first random number set to generate a temporal data stream, and the first processor further applies an instantaneous randomized response to the temporal data stream based on the second random number set to generate a first data stream having a first character, and
- wherein the plurality of random numbers further comprising a third random number set, and the processor unit further comprising a second processor; wherein the second processor applies a synthetic randomized response to the first data stream based on the third random number set to generate the second data stream having the second character.

11. The data collection and analysis method of claim 10, wherein a first variation between the original character and the first character is greater than a second variation between the original character and the second character, and the first variation and the second variation are calculated based by Hamming distances.

* * * * *